(12) United States Patent
Harigai

(10) Patent No.: US 8,260,045 B2
(45) Date of Patent: Sep. 4, 2012

(54) COLOR CORRECTION COEFFICIENT GENERATOR, COLOR CORRECTION COEFFICIENT GENERATION METHOD AND COMPUTER READABLE MEDIUM

(75) Inventor: Jungo Harigai, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 873 days.

(21) Appl. No.: 12/369,446

(22) Filed: Feb. 11, 2009

(65) Prior Publication Data

US 2009/0208101 A1 Aug. 20, 2009

(30) Foreign Application Priority Data

Feb. 18, 2008 (JP) ................................. 2008-035766
Dec. 15, 2008 (JP) ................................. 2008-318636

(51) Int. Cl.
*G06K 9/00* (2006.01)
(52) U.S. Cl. ......................................................... 382/167
(58) Field of Classification Search .................. 382/162, 382/167, 254; 358/1.9, 2.1, 518–520; 345/589, 345/600–604; 348/222.1, 229.1, 255
See application file for complete search history.

(56) References Cited

U.S. PATENT DOCUMENTS

| | | | | |
|---|---|---|---|---|
| 6,088,038 A * | 7/2000 | Edge et al. | | 345/600 |
| 6,100,999 A | 8/2000 | Ikegami | | |
| 6,760,108 B2 * | 7/2004 | Ohga | | 356/406 |
| 7,646,507 B2 * | 1/2010 | Ono | | 358/1.9 |
| 7,697,167 B2 * | 4/2010 | Hatori | | 358/2.1 |

FOREIGN PATENT DOCUMENTS

| | | |
|---|---|---|
| JP | A-01-238278 | 9/1989 |
| JP | A-10-262157 | 9/1998 |
| JP | A-2002-064722 | 2/2002 |
| JP | A-2006-343682 | 12/2006 |

* cited by examiner

*Primary Examiner* — Jose Couso
(74) *Attorney, Agent, or Firm* — Oliff & Berridge, PLC

(57) ABSTRACT

The color correction coefficient generator includes: a first color value acquiring unit that acquires correction-intended color values in a first color space configured of color components including a particular color component; a second color value acquiring unit that acquires correction color values being color values in a second color space configured of color components including the particular color component, and the correction color values being color values used to correct the correction-intended color values; a weight coefficient acquiring unit that acquires weight coefficients for the correction-intended color values; and a generating unit that generates a color correction coefficient on the basis of the correction color values for correcting the correction-intended color values having the particular color component at a density of a particular density value and on the basis of the weight coefficients for the correction-intended color values, the color correction coefficient used to correct the particular density value.

14 Claims, 26 Drawing Sheets

FIG.2

| INPUT VALUES | | | | CORRECTION VALUES | | | |
|---|---|---|---|---|---|---|---|
| C | M | Y | K | C' | M' | Y' | K' |
| 0 | 0 | 0 | 0 | 0 | 0 | 0 | 0 |
| 0 | 0 | 10 | 0 | 0 | 0 | 12 | 0 |
| 0 | 0 | 20 | 0 | 0 | 0 | 25 | 0 |
| 0 | 0 | 30 | 0 | 0 | 0 | 35 | 0 |
| : | : | : | : | : | : | : | : |
| 50 | 50 | 10 | 0 | 43 | 51 | 15 | 0 |
| 50 | 50 | 20 | 0 | 47 | 54 | 30 | 0 |
| 50 | 50 | 30 | 0 | 49 | 49 | 40 | 0 |
| : | : | : | : | : | : | : | : |
| 100 | 100 | 80 | 0 | 99 | 95 | 83 | 0 |
| 100 | 100 | 90 | 0 | 100 | 97 | 91 | 0 |
| 100 | 100 | 100 | 0 | 100 | 99 | 97 | 0 |
| 0 | 0 | 0 | 10 | 0 | 0 | 0 | 10 |
| 0 | 0 | 0 | 20 | 0 | 0 | 0 | 20 |
| 0 | 0 | 0 | 30 | 0 | 0 | 0 | 30 |
| 0 | 0 | 0 | 40 | 0 | 0 | 0 | 40 |
| : | : | : | : | : | : | : | : |
| 0 | 0 | 0 | 80 | 0 | 0 | 0 | 80 |
| 0 | 0 | 0 | 90 | 0 | 0 | 0 | 90 |
| 0 | 0 | 0 | 100 | 0 | 0 | 0 | 100 |

FIG.3A

| CORRECTION-DESTINATION DEVICE BASE DATA | | | | | | |
|---|---|---|---|---|---|---|
| C | M | Y | K | L* | a* | b* |
| 0 | 0 | 0 | 0 | L01 | a01 | b01 |
| 0 | 0 | 0 | 25 | L02 | a02 | b02 |
| 0 | 0 | 0 | 50 | L03 | a03 | b03 |
| 0 | 0 | 0 | 75 | L04 | a04 | b04 |
| 0 | 0 | 0 | 100 | L05 | a05 | b05 |
| 0 | 0 | 25 | 0 | L06 | a06 | b06 |
| 0 | 0 | 25 | 25 | L07 | a07 | b07 |
| : | : | : | : | : | : | : |

FIG.3B

| CORRECTION-SOURCE DEVICE BASE DATA | | | | | | |
|---|---|---|---|---|---|---|
| C | M | Y | K | L* | a* | b* |
| 0 | 0 | 0 | 0 | L11 | a11 | b11 |
| 0 | 0 | 0 | 25 | L12 | a12 | b12 |
| 0 | 0 | 0 | 50 | L13 | a13 | b13 |
| 0 | 0 | 0 | 75 | L14 | a14 | b14 |
| 0 | 0 | 0 | 100 | L15 | a15 | b15 |
| 0 | 0 | 25 | 0 | L16 | a16 | b16 |
| 0 | 0 | 25 | 25 | L17 | a17 | b17 |
| : | : | : | : | : | : | : |

FIG.5

| INPUT VALUES | | | | CORRECTION VALUES | | | | WEIGHT COEFFICIENT |
|---|---|---|---|---|---|---|---|---|
| C | M | Y | K | C' | M' | Y' | K' | W |
| 0 | 0 | 0 | 0 | 0 | 0 | 0 | 0 | 1.00 |
| 0 | 0 | 10 | 0 | 0 | 0 | 12 | 0 | 1.00 |
| 0 | 0 | 20 | 0 | 0 | 0 | 25 | 0 | 1.00 |
| 0 | 0 | 30 | 0 | 0 | 0 | 35 | 0 | 1.00 |
| : | : | : | : | : | : | : | : | |
| 50 | 50 | 10 | 0 | 43 | 51 | 15 | 0 | 0.18 |
| 50 | 50 | 20 | 0 | 47 | 54 | 30 | 0 | 0.16 |
| 50 | 50 | 30 | 0 | 49 | 49 | 40 | 0 | 0.16 |
| : | : | : | : | : | : | : | : | |
| 100 | 100 | 80 | 0 | 99 | 95 | 83 | 0 | 0.05 |
| 100 | 100 | 90 | 0 | 100 | 97 | 91 | 0 | 0.04 |
| 100 | 100 | 100 | 0 | 100 | 99 | 97 | 0 | 0.03 |
| 0 | 0 | 0 | 10 | 0 | 0 | 0 | 10 | 1.00 |
| 0 | 0 | 0 | 20 | 0 | 0 | 0 | 20 | 1.00 |
| 0 | 0 | 0 | 30 | 0 | 0 | 0 | 30 | 1.00 |
| 0 | 0 | 0 | 40 | 0 | 0 | 0 | 40 | 1.00 |
| : | : | : | : | : | : | : | : | |
| 0 | 0 | 0 | 80 | 0 | 0 | 0 | 80 | 1.00 |
| 0 | 0 | 0 | 90 | 0 | 0 | 0 | 90 | 1.00 |
| 0 | 0 | 0 | 100 | 0 | 0 | 0 | 100 | 1.00 |

PRIMARY COLOR ORIENTED WEIGHT
COEFFICIENT FUNCTION

GRAY ORIENTED WEIGHT COEFFICIENT FUNCTION

PARTICULAR COLOR ORIENTED WEIGHT
COEFFICIENT FUNCTION

LOW-DENSITY ORIENTED WEIGHT
COEFFICIENT FUNCTION

HIGH-DENSITY ORIENTED WEIGHT
COEFFICIENT FUNCTION

COMBINATION OF LOW-DENSITY ORIENTED WEIGHT COEFFICIENT FUNCTION
AND PRIMARY COLOR ORIENTED WEIGHT COEFFICIENT FUNCTION

COMBINATION OF HIGH-DENSITY ORIENTED WEIGHT COEFFICIENT
FUNCTION AND GRAY ORIENTED WEIGHT COEFFICIENT FUNCTION

FIG.11

| INPUT VALUES | CORRECTION VALUES | WEIGHT COEFFICIENT |
|---|---|---|
| Y | Y' | W |
| 0 | 0 | 1.00 |
| 10 | 12 | 1.00 |
| 20 | 25 | 1.00 |
| 30 | 35 | 1.00 |
| : | : | |
| 10 | 15 | 0.18 |
| 20 | 30 | 0.16 |
| 30 | 40 | 0.16 |
| : | : | |
| 80 | 83 | 0.05 |
| 90 | 91 | 0.04 |
| 100 | 97 | 0.03 |
| 0 | 0 | 1.00 |
| 0 | 0 | 1.00 |
| 0 | 0 | 1.00 |
| 0 | 0 | 1.00 |
| : | : | |
| 0 | 0 | 1.00 |
| 0 | 0 | 1.00 |
| 0 | 0 | 1.00 |

FIG.13A

| C | M | Y | K | L* | a* | b* | L* | a* | b* | ΔE |
|---|---|---|---|----|----|----|----|----|----|----|
| 0 | 0 | 0 | 0 | 94.3 | 0.2 | 0.5 | 94.2 | 0.3 | 0.4 | 0.17 |
| 0 | 0 | 10 | 0 | 92.9 | 1.0 | 4.2 | 92.3 | 0.5 | 3.3 | 1.19 |
| 0 | 0 | 20 | 0 | 92.2 | 1.4 | 8.2 | 91.8 | 1.0 | 7.5 | 0.90 |
| 0 | 0 | 30 | 0 | 91.8 | 1.9 | 12.9 | 91.1 | 1.4 | 10.9 | 2.18 |
| : | : | : | : | : | : | : | : | : | : | : |
| AVERAGE COLOR DIFFERENCE OF Y PRIMARY COLOR REGION ||||||||||| 1.11 |
| IMPORTANT COLOR WEIGHT OF Y PRIMARY COLOR REGION ||||||||||| 0.3 |

FIG.13B

| C | M | Y | K | L* | a* | b* | L* | a* | b* | ΔE |
|---|---|---|---|----|----|----|----|----|----|----|
| 0 | 0 | 0 | 0 | 94.3 | 0.2 | 0.5 | 94.2 | 0.3 | 0.4 | 0.17 |
| 0 | 10 | 0 | 0 | 91.2 | 1.5 | -2.8 | 91.0 | 3.2 | -3.8 | 2.00 |
| 0 | 20 | 0 | 0 | 89.2 | 3.9 | -4.5 | 88.8 | 6.8 | -6.3 | 3.44 |
| 0 | 30 | 0 | 0 | 87.3 | 10.2 | -6.0 | 86.4 | 12.8 | -8.2 | 3.52 |
| : | : | : | : | : | : | : | : | : | : | : |
| AVERAGE COLOR DIFFERENCE OF M PRIMARY COLOR REGION ||||||||||| 2.28 |
| IMPORTANT COLOR WEIGHT OF M PRIMARY COLOR REGION ||||||||||| 0.5 |

FIG.13C

| C | M | Y | K | L* | a* | b* | L* | a* | b* | ΔE |
|---|---|---|---|----|----|----|----|----|----|----|
| 0 | 0 | 0 | 0 | 94.3 | 0.2 | 0.5 | 94.2 | 0.3 | 0.4 | 0.17 |
| 10 | 0 | 0 | 0 | 91.2 | -1.0 | -3.0 | 91.0 | -1.2 | -3.8 | 0.85 |
| 20 | 0 | 0 | 0 | 89.2 | -3.4 | -5.2 | 88.8 | -3.8 | -6.0 | 0.98 |
| 30 | 0 | 0 | 0 | 87.3 | -6.2 | -6.3 | 86.4 | -6.8 | -7.2 | 1.41 |
| : | : | : | : | : | : | : | : | : | : | : |
| AVERAGE COLOR DIFFERENCE OF C PRIMARY COLOR REGION ||||||||||| 0.85 |
| IMPORTANT COLOR WEIGHT OF C PRIMARY COLOR REGION ||||||||||| 0.2 |

FIG.14

| C | M | Y | K | L* | a* | b* | L* | a* | b* | ΔE | WEIGHT |
|---|---|---|---|----|----|----|----|----|----|----|--------|
| 0 | 0 | 0 | 0 | 94.3 | 0.2 | 0.5 | 94.2 | 0.3 | 0.4 | 0.17 | 0.2 |
| 0 | 0 | 10 | 0 | 92.9 | 1.0 | 4.2 | 92.3 | 0.5 | 3.3 | 1.19 | 0.4 |
| 0 | 0 | 20 | 0 | 92.2 | 1.4 | 8.2 | 91.8 | 1.0 | 7.5 | 0.90 | 0.3 |
| 0 | 0 | 30 | 0 | 91.8 | 1.9 | 12.9 | 91.1 | 1.4 | 10.9 | 2.18 | 0.8 |
| : | : | : | : | : | : | : | : | : | : | : | : |

FIG.18-1A

| ACCURACY ORIENTED BALANCE SETTING | ACCURACY INDEX VALUE | ACCURACY BALANCE | |
|---|---|---|---|
| PRIMARY COLOR ACCURACY INDEX | 10 | 0.10 | SETTING |
| 3C GRAY ACCURACY INDEX | 50 | 0.50 | SETTING |
| PARTICULAR COLOR (SKIN COLOR) ACCURACY INDEX | 10 | 0.10 | SETTING |
| PARTICULAR COLOR (SKY COLOR) ACCURACY INDEX | 10 | 0.10 | SETTING |
| PARTICULAR COLOR (GREEN COLOR) ACCURACY INDEX | 10 | 0.10 | SETTING |
| 3C ACCURACY INDEX | 10 | 0.10 | SETTING |

OK   CANCEL

FIG.18-1B

| ACCURACY ORIENTED BALANCE SETTING | ACCURACY INDEX VALUE | ACCURACY BALANCE | |
|---|---|---|---|
| PRIMARY COLOR ACCURACY INDEX | 30 | 0.30 | SETTING |
| 2C PURE COLOR ACCURACY INDEX | 0 | 0.00 | SETTING |
| 3C GRAY ACCURACY INDEX | 70 | 0.70 | SETTING |
| PARTICULAR COLOR (SKIN COLOR) ACCURACY INDEX | 0 | 0.00 | SETTING |
| PARTICULAR COLOR (SKY COLOR) ACCURACY INDEX | 0 | 0.00 | SETTING |
| PARTICULAR COLOR (GREEN COLOR) ACCURACY INDEX | 0 | 0.00 | SETTING |
| 2C ACCURACY INDEX | 0 | 0.00 | SETTING |
| 3C ACCURACY INDEX | 0 | 0.00 | SETTING |

OK   CANCEL

FIG.18-2C

| ACCURACY ORIENTED BALANCE SETTING | | | |
|---|---|---|---|
| | ACCURACY INDEX VALUE | ACCURACY BALANCE | |
| C PRIMARY COLOR ACCURACY INDEX | 30 | 0.158 | SETTING |
| M PRIMARY COLOR ACCURACY INDEX | 30 | 0.158 | SETTING |
| Y PRIMARY COLOR ACCURACY INDEX | 30 | 0.158 | SETTING |
| R PURE COLOR ACCURACY INDEX | 10 | 0.053 | SETTING |
| G PURE COLOR ACCURACY INDEX | 10 | 0.053 | SETTING |
| B PURE COLOR ACCURACY INDEX | 10 | 0.053 | SETTING |
| 3C GRAY ACCURACY INDEX | 70 | 0.368 | SETTING |
| PARTICULAR COLOR (SKIN COLOR) ACCURACY INDEX | 0 | 0.00 | SETTING |
| PARTICULAR COLOR (SKY COLOR) ACCURACY INDEX | 0 | 0.00 | SETTING |
| PARTICULAR COLOR (GREEN COLOR) ACCURACY INDEX | 0 | 0.00 | SETTING |
| 2C ACCURACY INDEX | 0 | 0.00 | SETTING |
| 3C ACCURACY INDEX | 0 | 0.00 | SETTING |
| PARTICULAR COLOR MANUAL 1 | 0 | 0.00 | SETTING |
| PARTICULAR COLOR MANUAL 2 | 0 | 0.00 | SETTING |
| PARTICULAR COLOR MANUAL 3 | 0 | 0.00 | SETTING |
| PARTICULAR COLOR MANUAL 4 | 0 | 0.00 | SETTING |

OK    CANCEL

FIG.20

| | LIGHT COLOR ACCURACY INDEX | DARK COLOR ACCURACY INDEX | |
|---|---|---|---|
| HIGH-AND-LOW DENSITY BALANCE COMBINATION TYPE / ACCURACY ORIENTED BALANCE SETTING | | | |
| PRIMARY COLOR ACCURACY INDEX | 50 | 0 | SETTING |
| 3C GRAY ACCURACY INDEX | 20 | 60 | SETTING |
| PARTICULAR COLOR (SKIN COLOR) ACCURACY INDEX | 10 | 10 | SETTING |
| PARTICULAR COLOR (SKY COLOR) ACCURACY INDEX | 10 | 10 | SETTING |
| PARTICULAR COLOR (GREEN COLOR) ACCURACY INDEX | 10 | 10 | SETTING |
| 3C ACCURACY INDEX | 0 | 10 | SETTING |

CONFIRM    OK    CANCEL

US 8,260,045 B2

COLOR CORRECTION COEFFICIENT GENERATOR, COLOR CORRECTION COEFFICIENT GENERATION METHOD AND COMPUTER READABLE MEDIUM

CROSS REFERENCE TO RELATED APPLICATIONS

This application is based on and claims priority under 35 USC §119 from Japanese Patent Application No. 2008-035766 filed Feb. 18, 2008 and Japanese Patent Application No. 2008-318636 filed Dec. 15, 2008.

BACKGROUND

1. Technical Field

The present invention relates to a color correction coefficient generator, a color correction coefficient generation method and a computer readable medium storing a program.

2. Related Art

Recent widespread of color devices such as digital cameras, color scanners, color printers and color displays has boosted a market demand for colors. This demand is especially high for systems used in desk top publishing (DTP) and the like. A color management system (CMS) is indispensable for devices of such systems, and a device calibration technique has been developed for achievement of stable color reproduction in devices. So far, such color correction has been preformed on the basis of a color profile, typically an ICC profile, or the like. Specifically, a coefficient for each grid point in a look-up table (LUT) for color correction is firstly determined, and then color correction is performed in any of various types of already-invented interpolation processing or the like using the coefficient.

Most of the color correction methods for the device calibration techniques are currently based on a one-dimensional LUT. For such calibration, there are two main types of calibration techniques, one of which is for primary color calibration for correcting primary colors, and the other of which is for gray balance calibration for correcting a process black that is a mixture of three colors of cyan (C), magenta (M), and yellow (Y) In other words, the techniques for tone reproduction curve (TRC) type calibration have been already developed.

However, such TRC type calibration has limitation as this technique capable of correcting only a certain part of colors. For example, as for the primary color calibration, only a part consisting of any primary color is a correction target and sufficiently-high correction accuracy is not guaranteed for a part consisting of mixed colors such as a secondary color or tertiary color. As for the gray balance calibration, only a part of a process gray that is the mixture of three colors is to be corrected, and achievement of sufficiently-high correction accuracy is not guaranteed for a part of colors other than the process gray.

SUMMARY

According to an aspect of the invention, there is provided a color correction coefficient generator including: a first color value acquiring unit that acquires correction-intended color values in a first color space configured of plural color components including a particular color component; a second color value acquiring unit that acquires correction color values being color values in a second color space configured of plural color components including the particular color component, and the correction color values being color values used to correct the correction-intended color values; a weight coefficient acquiring unit that acquires weight coefficients for the correction-intended color values; and a generating unit that generates a color correction coefficient on the basis of the correction color values for correcting the correction-intended color values having the particular color component at a density of a particular density value and on the basis of the weight coefficients for the correction-intended color values, the color correction coefficient used to correct the particular density value.

BRIEF DESCRIPTION OF THE DRAWINGS

Exemplary embodiment(s) of the present invention will be described in detail based on the following figures, wherein:

FIG. 2 shows data of tertiary colors composed of three primary colors with the coverage in 10% increments, and data of K primary colors with the coverage in 10% increments;

FIG. 3A shows one example of the correction-destination device base data;

FIG. 3B shows one example of the correction-source device base data;

FIG. 5 shows that the weight coefficients are respectively added to the associations between the input values and the correction values;

FIG. 11 shows the associations among the extracted input values, correction values and weight coefficients;

FIGS. 13A to 13C show that the average color differences and the important color weights are calculated for color regions;

FIG. 14 is a diagram showing that the important color weight is calculated on the basis of a color difference for each piece of color data;

FIGS. 18-1A to 18-2C show examples of a parameter setting screen used in the professional mode (fixed balance combination type);

FIGS. 19-1A to 19-3E show examples of screens used to set color balance parameters;

FIG. 20 shows an example of a parameter setting screen used in the professional mode (high-and-low density balance combination type);

DETAILED DESCRIPTION

Figure 1:
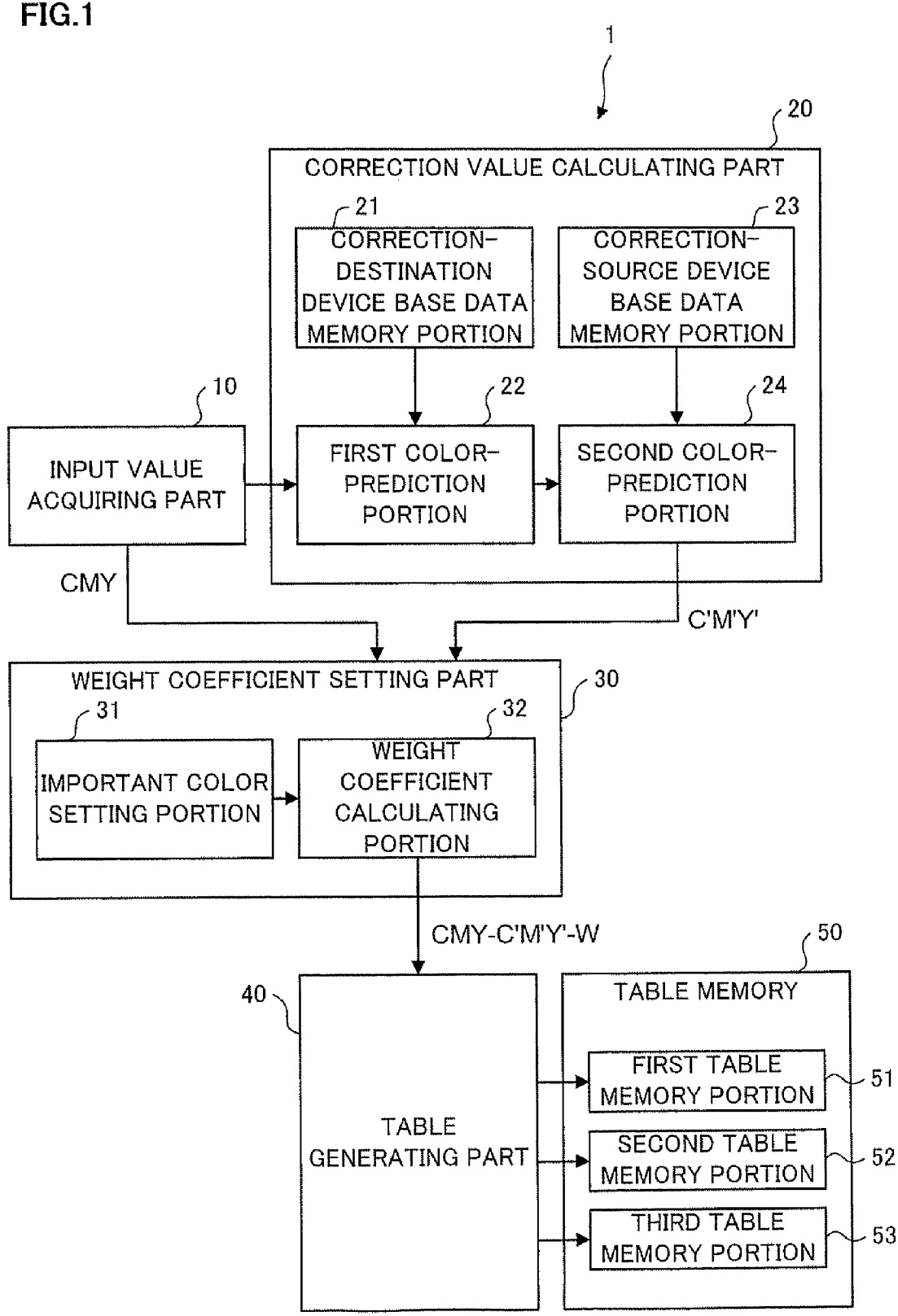
FIG. 1 is a block diagram showing a functional configuration of a color correction coefficient generator according to a first exemplary embodiment of the present invention.

Hereinafter, exemplary embodiments for carrying out the present invention will be described in detail with reference to the accompanying drawings.

As described above, the conventional color correction through the primary color calibration or gray balance calibration (TRC type calibration) is specific to a particular color, and thus fails to improve the correction accuracy for an entire color gamut to be reproduced. In particular, the electrophotographic method inevitably suffers from variation in the toner amounts of respective colors in multi-layer transfer. Due to this, no matter how accurately the color correction is performed for each primary color, the color balance is disturbed for secondary or higher-order colors.

To address this problem, calibration (DLUT type calibration) using a three-dimensional LUT has been recently employed in some devices. This calibration is capable of controlling the correction for the almost entire color gamut to be reproduced in a device, and thereby the calibration achieves significant improvement in the color correction accuracy. In the case of using such a three-dimensional LUT, however, data on colors of a number equal to the number of dimensions of the DLUT (the values of each pixel for C, M and Y) has to exist all together. To put it another way, prior to color separation into CMY by a raster image processor (RIP), the color correction needs to be performed. On the other hand, the electrographic method generally employs a system configuration in which the color correction is performed in a frame sequential manner on C, M and Y images obtained through the color separation by the RIP. Accordingly, due to the current system configuration described above, the DLUT type calibration is difficult to be introduced.

In these exemplary embodiments, data on correction-destination colors, and data on device output colors for an entire region are firstly acquired. Then, based on the data thus acquired, correction values are calculated evenly for the entire color gamut. Thereafter, a weight coefficient is added to each of the calculated correction values. The values based on the correction values to which the weight coefficients are respectively added are fed back to a one-dimensional LUT. Thereby, color correction with well-balanced accuracy is achieved for the entire color gamut. Moreover, color correction coefficients may be determined so as to enhance the reproducibility for a portion, such as a primary color, a gray color, a secondary color, or a particular color, which is considered as important by a user. In addition, by addition of a weight coefficient to a particular color region such as a low-density region or high-density region, different color regions are settable as important color regions for respective density levels. This leads to simultaneous achievement of both of color reproduction of a low-density region with importance on the primary color and color reproduction of a high-density region with importance on a gray, for example.

Hereinafter, a description will be given for specific exemplary embodiments for achieving such color reproduction.

(First Exemplary Embodiment)

FIG. 1 is a block diagram showing a functional configuration of a color correction coefficient generator according to a first exemplary embodiment of the present invention.

A color correction coefficient generator 1 in the first exemplary embodiment includes an input value acquiring part 10, a correction value calculating part 20, a weight coefficient setting part 30, a table generating part 40, and a table memory 50.

The input value acquiring part 10 acquires correction-intended color data to be used as an input The color data may include information on colors important for color correction because correction coefficients are generated for the correction-intended color data acquired here. For example, information considered to be generated for this purpose is information on each of primary colors C, M, Y, K and information on C, M, Y, K included in colors, such as gray, made of mixtures of three colors. Instead, if color correction needs to be made for an entire color gamut, information on grid points as in a DLUT grid may be generated. Here, an example of the correction-intended color data is illustrated in a section named "input value" in FIG. 2. FIG. 2 shows data of tertiary colors ($11^3$ colors) composed of three primary colors with the coverage in 10% increments, and data of K primary colors (10 colors) with the coverage in 10% increments. Incidentally, in the first exemplary embodiment, the input value acquiring part 10 is provided as an example of a first color value acquiring unit that acquires correction-intended color values.

The correction value calculating part 20 calculates correction values used to correct the correction-intended color data acquired by the input value acquiring part 10. To be more specific, the correction value calculating part 20 includes a correction-destination device base data memory portion 21, a first color-prediction portion 22, a correction-source device base data memory portion 23 and a second color-prediction portion 24.

Among these portions, the correction-destination device base data memory portion 21 stores correction-destination device base data.

Here, the correction-destination device base data is data representing output colors of a correction-destination device when color correction is performed.

FIG. 3A shows one example of the correction-destination device base data. This is an example for a case of a printer for four colors CMYK. In this case, the correction-destination device base data is a set of data pairs (base data) of device-dependent data (CMYK) and the corresponding device-independent data (L*a*b*). Here, the device-independent data is described by taking widely-used L*a*b* as an example, but is not limited to this. The device-independent data may be any type of data as long as the data is usable to generate data pairs representing device characteristics, and may be, for example, data in a color specification system classified as tristimulus values XYZ, a uniform color space L*u*v* or the like; data expressed as polynomial approximation or the like such as in (Lab)=F (CMYK); data expressed in a physical model formula of a Neugebauer type, a Kubelka-Munk type, a Lambert-Beer formula type or any other equivalent type; data converted on the basis of the ICC profile or the like. This set of data pairs may include any number of data pairs in general, but may desirably include approximately 200 to 1600 data pairs from the viewpoint of the color accuracy and system configuration. Based on this set of data pairs, the output characteristics of the correction-destination device are figured out, and prediction for output colors of the correction-destination device corresponding to the correction-intended points may be made.

In addition, by use of the correction-destination device base data, the first color-prediction portion 22 predicts device-independent color data (for example, L*a*b*) corresponding to correction-intended device-dependent color data (for example, CMY) acquired by the input value acquiring part 10 (CMY to L*a*b*). For this color prediction, various techniques have been invented. For instance, the technique described in Japanese Patent Application Laid Open Publication No. 10-262157 may be used to predict the colors, although the usable technique is not limited to this, particularly.

On the other hand, the correction-source device base data memory portion 23 stores correction-source device base data.

Here, the correction-source device base data is data representing the output colors of a device whose data is to be corrected for color correction.

FIG. 3B shows one example of the correction-source device base data. This is an example for a case of a printer for four colors CMYK. As is clear from the drawings, the format of the correction-source device base data is the same as the format of the correction-destination device base data. In this case, a data pair is composed of data in CMYK or the like classified as a device-dependent color space, and the corresponding data in L*a*b* or the like classified as a device-independent color space, and a sufficiently necessary number of such data pairs (base data) are prepared, as the correction-source device base data. As has been described in the description of the correction-destination device base data, the type of the base data is not limited to the aforementioned one, but may be any type as long as the data is usable to generate data pairs representing the device characteristics. Moreover, this set of data pairs may include any number of data pairs, but may desirably include approximately 200 to 1600 data pairs from the viewpoint of the color accuracy and system configuration.

In addition, by use of the correction-source device base data, the second color-prediction portion 24 predicts device-dependent color data (C'M'Y') corresponding to device-independent color data (for example, L*a*b*) generated by the first color-prediction portion 22. For the color prediction of the second color-prediction portion 24, various techniques have also been invented as in the case of the first color-prediction portion 22. For instance, the technique described in Japanese Patent Application Laid Open Publication No. 10-262157 may also be used to predict the colors, although the usable technique is particularly not limited to this.

As described above, the correction value calculating part 20 calculates correction values corresponding to all the correction-intended color data acquired by the input value acquiring part 10. A section named "correction value" in FIG. 2 indicates an example of correction values thus calculated. In this example, the second row indicates that (C, M, Y, K) =(0, 0, 10, 0) is corrected to (C', M', Y', K')=(0, 0, 12, 0). Note that, in the first exemplary embodiment, the correction value calculating part 20 is provided as an example of a second color value acquiring unit that acquires color values for correction.

The weight coefficient setting part 30 calculates a weight coefficient indicating importance of a correction value. To be more specific, the weight coefficient setting part 30 includes an important color setting portion 31 and a weight coefficient calculating portion 32.

Among these portions, the important color setting portion 31 receives designation of a color region where a user desires to obtain enhanced color reproducibility (for example, a color region considered important by the user), and sets the color region as an important color region. The important color setting portion 31 may set multiple important color regions in this setting. In the first exemplary embodiment, the important color setting portion 31 is provided as an example of a receiving unit that receives designation of an important color region.

The weight coefficient calculating portion 32 receives the correction-intended color data acquired by the input value acquiring part 10 and the correction values calculated for the color data by the correction value calculating part 20, and generates a weight coefficient for each set of correction values in accordance with a relationship between the correction-intended color data and the important color region set by the important color setting portion 31. In the first exemplary embodiment, the weight coefficient calculating portion 32 is provided as an example of a weight coefficient acquiring unit that acquires weight coefficients.

The table generating part 40 generates a one-dimensional LUT (TRC) for each of color components (for example, C, M, Y) constituting the correction-intended color data. More specifically, the table generating part 40 generates the one-dimensional LUT, on the basis of the correction values calculated by the correction value calculating part 20 and the weight coefficients corresponding to the correction values. In the first exemplary embodiment, the table generating part 40 is provided as an example of a generating unit that generates color correction coefficients.

The table memory 50 stores the one-dimensional LUTs generated by the table generating part 40. More specifically, the table memory 50 includes a first table memory portion 51, a second table memory portion 52, and a third table memory portion 53. The first table memory portion 51 stores TRCs from the input values C to the correction values C', the second table memory portion 52 stores TRCs from the input values M to the correction values M', and the third table memory portion 53 stores TRCs from the input values Y to the correction values Y'.

Hereinafter, a description will be provided for operations of the color correction coefficient generator 1 in the first exemplary embodiment.

Once the color correction coefficient generator 1 starts to operate, the input value acquiring part 10 acquires correction-intended color data and the correction value calculating part 20 calculates the correction values for the color data, as described above.

Then, in the weight coefficient setting part 30, the weight coefficient calculating portion 32 determines the weight coefficients for the correction values in accordance with the setting of the important color region made by the important color setting portion 31.

Figure 4:
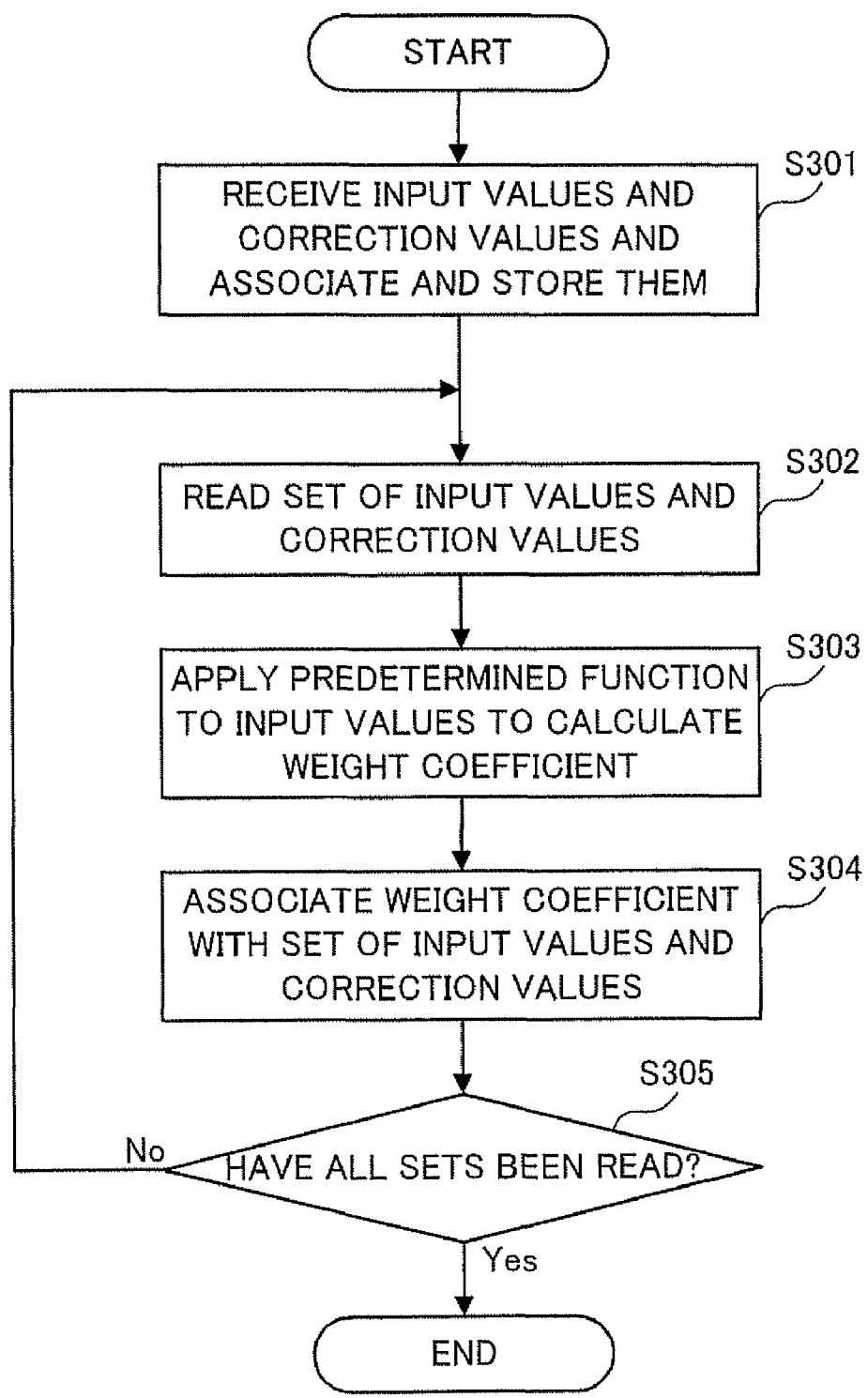
FIG. 4 is a flowchart showing an operation example of the weight coefficient calculating portion.

FIG. 4 is a flowchart showing an operation example of the weight coefficient calculating portion 32 at this time.

Upon start of operation, the weight coefficient calculating portion 32 firstly receives the input values from the input value acquiring part 10 and the correction values from the correction value calculating part 20, and then generates associations between the two types of values as shown in FIG. 2, and stores the associated values in a memory (step 301).

Thereafter, from the memory, the weight coefficient calculating portion 32 reads a set of input values and correction values associated with the input values (step 302). Then, the weight coefficient calculating portion 32 applies a predetermined function to the input values to calculate a weight coefficient (step 303), and stores the weight coefficient in association with the set of input values and correction values (step 304). In this case, the weight coefficient W is determined by W=f(D) where D denotes a predetermined variable with respect to the input values; and f denotes the weight coefficient calculation function.

Subsequently, the weight coefficient calculating portion 32 determines whether or not all the sets of input values and correction values stored in the memory have been already read (step 305). If all the sets have not been read yet, the processing returns to step 302 and the same processing is again performed for the next set of input values and correction values. If all the sets have been already read, the weight coefficient calculation processing is terminated.

FIG. 5 shows that the weight coefficients are respectively added to the associations between the input values and the correction values, as a result of the above processing.

In the first exemplary embodiment, the maximum value of the weight coefficient W is "1.00", and the weight coefficient "1.00" is added to (C, M, Y, K, C', M', Y', K') =(0, 0, 0, 0, 0, 0, 0, 0), (0, 0, 10, 0, 0, 0, 12, 0), (0, 0, 20, 0, 0, 0, 25, 0) and the like. In addition, weight coefficients smaller than "1.00", are added to (C, M, Y, K, C', M', Y', K')=(50, 50, 10, 0, 43, 51, 15, 0) and the like, and weight coefficients further smaller than "1.00" are added to (C, M, Y, K, C', M', Y', K')=(100, 100, 80, 0, 99, 95, 83, 0) and the like.

FIG. 5 illustrates the weight coefficients in the case where the important color setting portion 31 makes setting with importance on the primary colors and the weight coefficient calculating portion 32 uses a primary color oriented function as the weight coefficient calculation function f.

Figure 6:
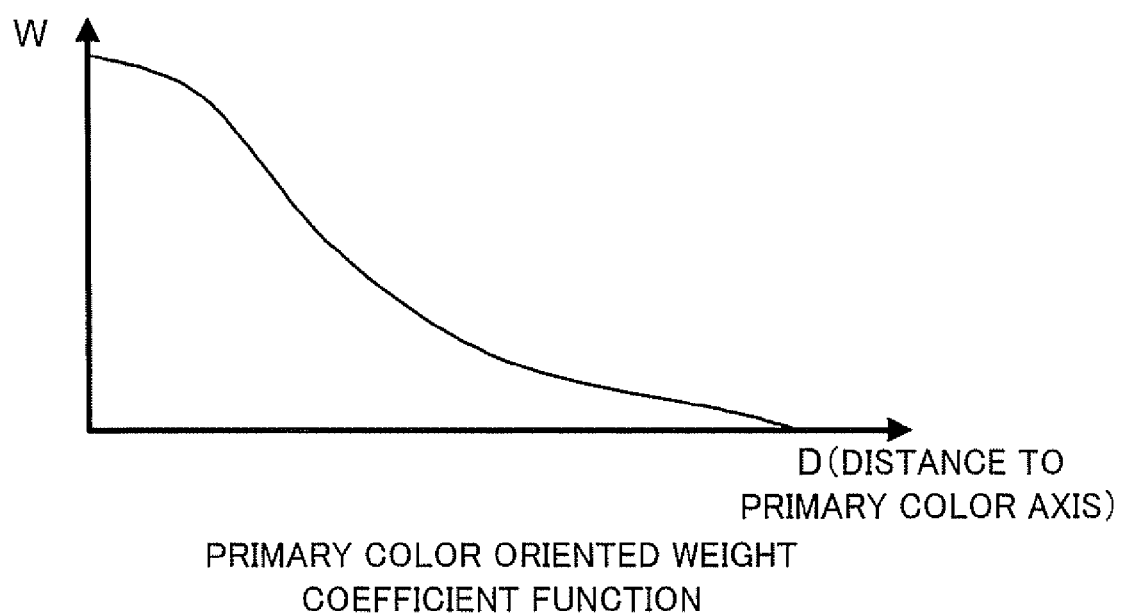
FIG. 6 is a graph showing an approximate shape of this primary color oriented function.

FIG. 6 is a graph showing an approximate shape of this primary color oriented function (primary color oriented weight coefficient function). In this function, the predetermined variable D with respect to the input values is a distance from each set of input values to the primary color axis, as shown in FIG. 6. To put it another way, a larger weight coefficient is added to a set of input values having a smaller distance to the primary color axis.

The mechanism is explained here by using the values shown in FIG. 5. The values (C, M, Y, K)=(0, 0, 0, 0), (0, 0, 10, 0), (0, 0, 20, 0) and (0, 0, 30, 0) represent points on the Y axis, and these points are located at a distance of 0 from the primary color axis. Therefore, the maximum value "1.00" of the weight coefficient is added thereto. On the other hand, the values (C, M, Y, K)=(50, 50, 10, 0), (50, 50, 20, 0) and (50, 50, 30, 0) represent points away from the primary color axis, and these points are located at the distances from the primary color axis (in this case, the C axis or the M axis) that become longer and longer in the above order. Accordingly, the weight coefficients added thereto become smaller and smaller in this order. The values (C, M, Y, K)=(100, 100, 80, 0), (100, 100, 90, 0) and (100, 100, 100, 0) represents points further away from the primary color axis, and these points are located at the distances from the primary color axis (in this case, the C axis or the M axis) that become longer and longer in the above order. Accordingly, the weight coefficients added thereto become smaller and smaller in this order.

Incidentally, this primary color oriented function is only one example of the function. Instead of this, any function producing similar effects is usable.

FIGS. 7A to 9B show other examples of the weight coefficient calculation function.

Figure 7A:
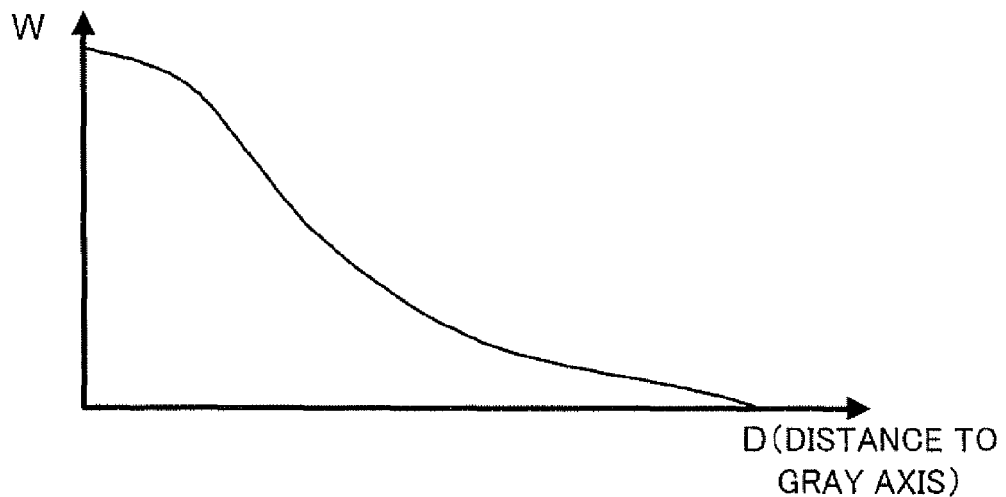
FIG. 7A is a graph showing an approximate shape of a gray oriented function.

First of all, FIG. 7A is a graph showing an approximate shape of a gray oriented function (gray oriented weight coefficient function). In this function, the predetermined variable D with respect to the input values is a distance from each set of input values to the gray axis, as shown in FIG. 7A. To put it another way, a larger weight coefficient is added to a set of input values having a smaller distance to the gray axis.

Figure 7B:
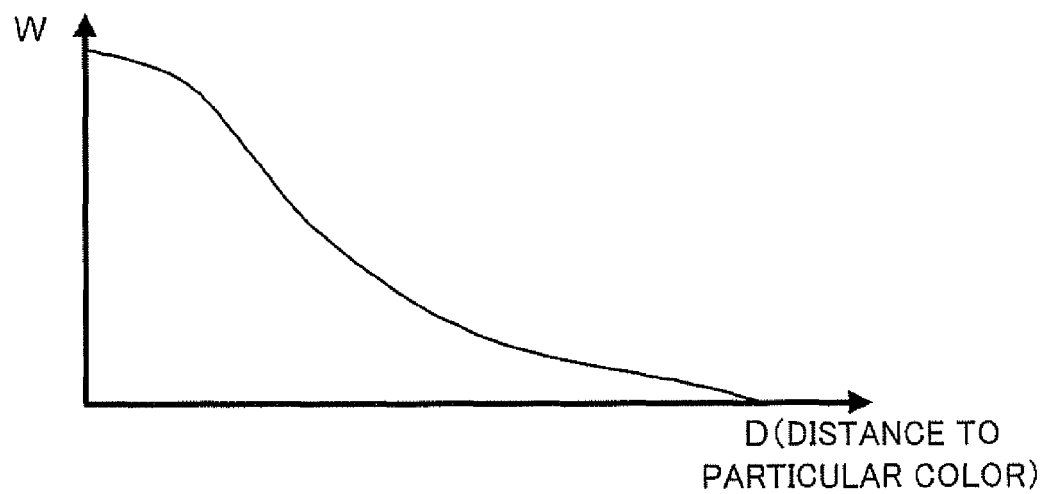
FIG. 7B is a graph showing an approximate shape of a particular color oriented function.

FIG. 7B is a graph showing an approximate shape of a particular color oriented function (particular color oriented weight coefficient function). In this function, the predetermined variable D with respect to the input values is a distance from each set of input values to the particular color, as shown in FIG. 7B. To put it another way, a larger weight coefficient is added to a set of input values having a smaller distance to the particular color. Here, the considerable particular color is any of various colors such as a sky color, skin color, and green color.

Figure 8A:
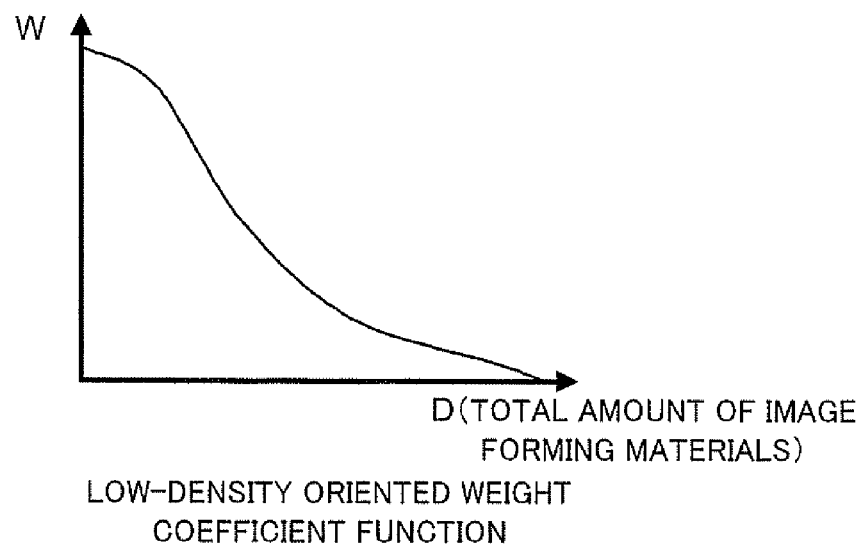
FIG. 8A is a graph showing an approximate shape of a low-density oriented function.

Alternatively, FIG. 8A is a graph showing an approximate shape of a low-density oriented function (low-density oriented weight coefficient function). In this function, the predetermined variable D with respect to the input values is the total amount of image forming materials used according to the input values, as shown in FIG. 8A. To put it another way, a larger weight coefficient is added to a set of input values requiring a smaller total amount of image forming materials.

Figure 8B:
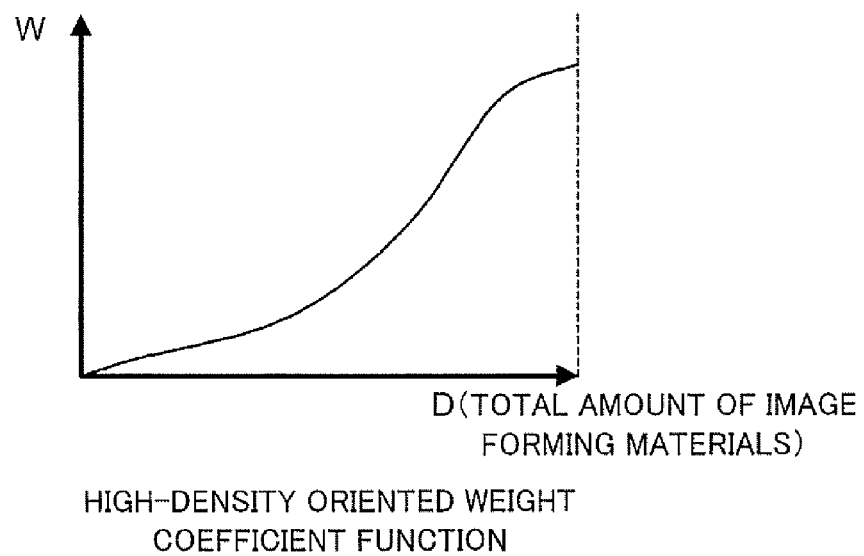
FIG. 8B is a graph showing an approximate shape of a high-density oriented function.

FIG. 8B is a graph showing an approximate shape of a high-density oriented function (high-density oriented weight coefficient function). In this function, the predetermined variable D with respect to the input values is also the total amount of image forming materials used according to the input values, as shown in FIG. 8B. To put it another way, a larger weight coefficient is added to a set of input values requiring a larger total amount of image forming materials.

Incidentally, toner, ink and the like are exemplified as the image forming materials in FIGS. 8A and 8B.

Otherwise, the weight coefficients may be calculated by use of a function made of a combination of these functions.

Figure 9A:
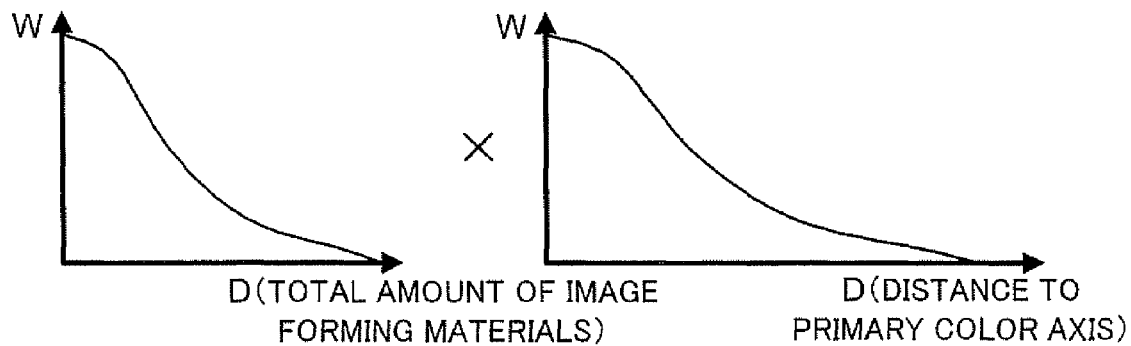
FIG. 9A shows an example in the case of using a combination of the low-density oriented function and the primary color oriented function.

FIG. 9A shows an example in the case of using a combination of the low-density oriented function and the primary color oriented function. In this case, a large weight coefficient is added to the correction values for a region in a primary color at a low density. On the other hand, a not-so-large weight coefficient is set for the correction values for a region even in a primary color but at a high density.

Figure 9B:
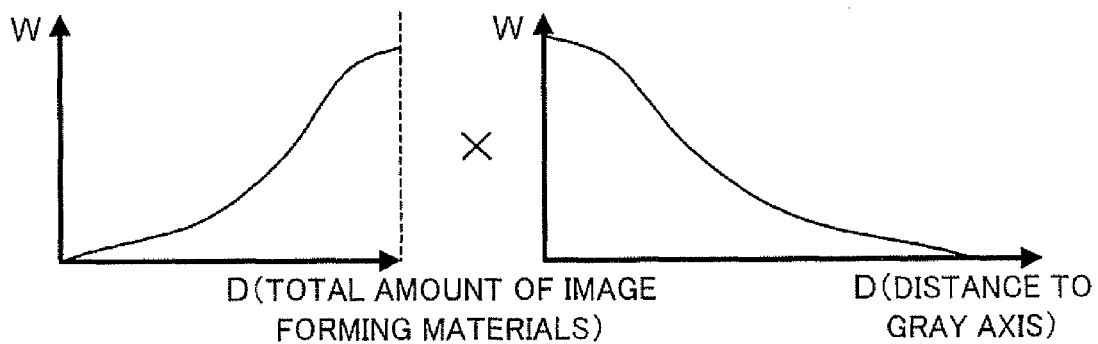
FIG. 9B shows an example in the case of using a combination of the high-density oriented function and the gray oriented function.

FIG. 9B shows an example in the case of using a combination of the high-density oriented function and the gray oriented function. In this case, a large weight coefficient is added to the correction values for a region in a gray color at a high density. On the other hand, a not-so-large weight coefficient is set for the correction values for a region even in a gray color but at a low density.

Instead of separately using the two functions in FIGS. 9A and 9B, these functions may be used in combination so that, for instance, a large weight coefficient is added to the correction values for a primary color region around a low density region, whereas a large weight coefficient is added to the correction values for a gray region around a high density region. In other words, the color region treated as an important region is continuously changed according to the target density.

After the weight coefficients are determined for the correction values as described above, the table generating part 40 generates the one-dimensional LUTs.

Figure 10:
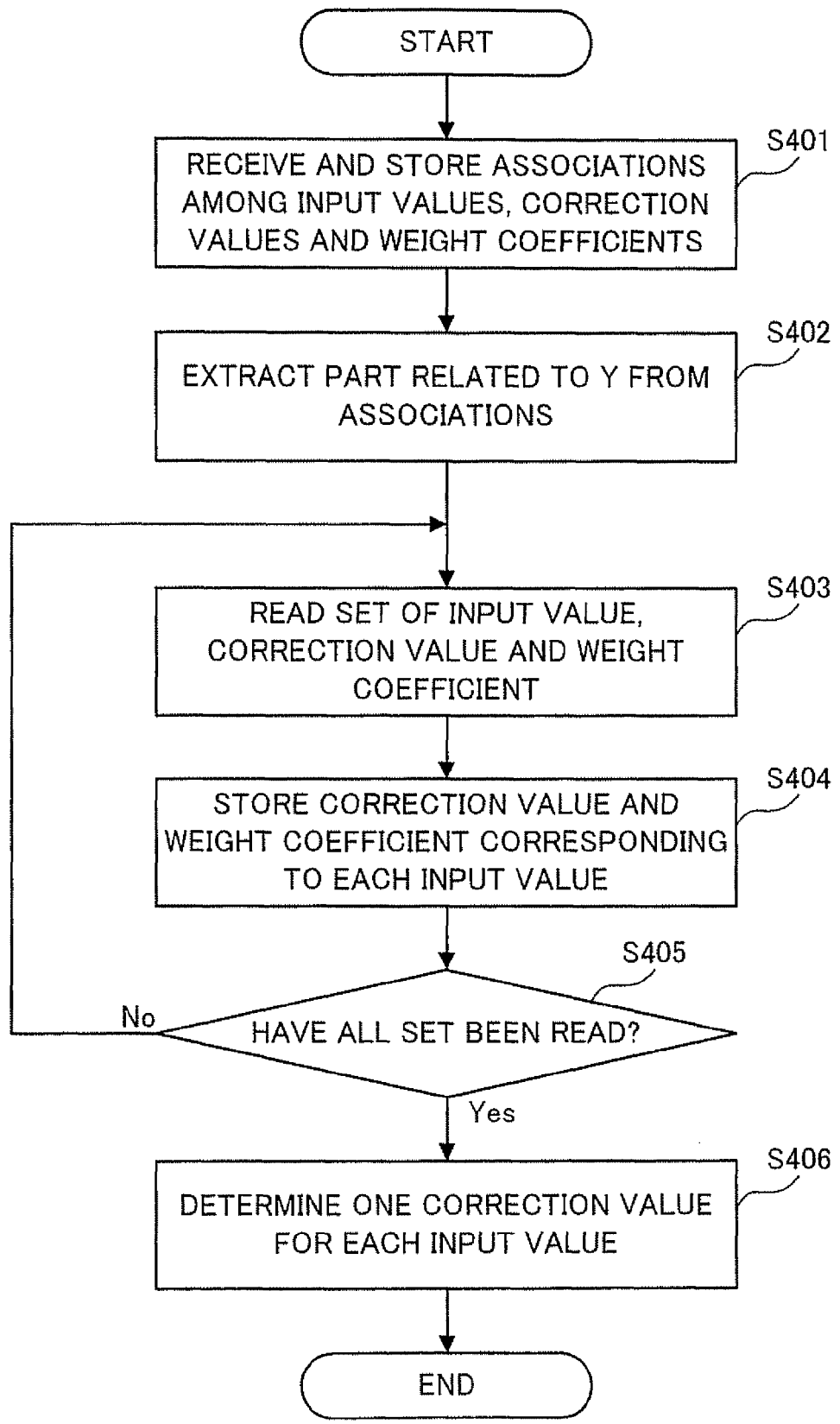
FIG. 10 is a flowchart showing an operation example of the table generating part.

FIG. 10 is a flowchart showing an operation example of the table generating part 40 at this time. In fact, the operations of the table generating part 40 include an operation of generating a TRC for converting C signals, an operation of generating a TRC for converting M signals, and an operation of generating a TRC for converting Y signals. However, these operations are basically the same. Thus, here, a description will be provided only for the case of generating the TRC for converting the Y signals.

Upon start of the operation, the table generating part 40 firstly receives the associations among the input values, the correction values, and the weight coefficients as shown in FIG. 5 from the weight coefficient calculating portion 32, and stores the received associations in the memory (step 401). Then, the table generating part 40 extracts a part related to the input values Y and the correction values Y' from the received associations (step 402). FIG. 11 shows the associations among the extracted input values Y, correction values Y' and weight coefficients W.

After that, the table generating part 40 reads from the memory each set of an input value, a correction value and a weight coefficient (step 403), and stores the correction value and the weight coefficient corresponding to each input value (step 404). In the example shown in FIG. 11, (Y', W) =(12, 1.00), (15, 0.18), . . . are stored corresponding to Y=10, (Y', W)=(25, 1.00), (30, 0.16), . . . are stored corresponding to Y=20, and (Y', W)=(35, 1.00), (40, 0.16), . . . are stored corresponding to Y=30.

Then, the table generating part 40 determines whether or not all the sets of the input value, the correction value and the weight coefficient stored in the memory have already been read (step 405). As a result, if all the sets have not been read yet, the processing returns to step 403, and the same processing is performed for the next set of the input value, the correction value and the weight coefficient. Otherwise, if all the sets have already been read, the table generating part 40 performs processing of determining one correction value for each input value (step 406).

A simple example of the processing of determining one correction value is a method of calculating a weighted average of correction values for each of input values in 10% increments.

Specifically, this is a method in which with multiple correction values corresponding to a certain input value are weighted with the respective weight coefficients and then the average of the weighted correction values is calculated.

This method, however, fails to obtain a correction value for an input value within an interval of the 10% increments. Such correction value may be obtained by interpolation, but the interpolation is not good enough since it also produces another problem such as a sudden change in tone. Instead, the accuracy may be improved by setting the input values to be incremented in the units smaller than 10%. In this case, however, the calculation amount is huge and a problem related to tone may occur.

To avoid these situations, calculation based on weighted regression is performed in the first exemplary embodiment. More specifically, a correction coefficient is calculated through weighted local regression on the basis of the data in FIG. 11. The correction coefficient may be calculated by using the aforementioned technique in Japanese Patent Application Laid Open Publication No. 10-262157. Here, the specific calculation method is described briefly. In order to determine one correction value for a focused input value, this method uses not only the correction values and the weight coefficients corresponding to the focused input value, but also the correction values and the weight coefficients corresponding to other input values. In this case, a largest weight is assigned to the correction values and the weight coefficients corresponding to the focused input value. In addition, the correction values and the weight coefficients corresponding to the other input values are weighted so that the lager the difference from the focused input value, the smaller the weight assigned thereto. Then, a local regression technique is applied to these weighted correction values and weight coefficients. The calculating of the correction value based on the regression as described above addresses the problems in terms of tone and calculation time described in relation to the aforementioned methods.

(Second Exemplary Embodiment)

In a second exemplary embodiment, a unit that sets an important color weight is further provided in addition to the components described in the first exemplary embodiment. This is a unit that assigns weight for color reproduction with importance on a primary color region or a gray region, which have been described in the first exemplary embodiment. For instance, this unit makes setting with the importance on the primary color region and the gray region in a ratio of 1:2. With this setting, colors in an entire color gamut are reproduced with the importance on the primary and gray colors, and, in particular, with importance on the gray regions.

Figure 12:
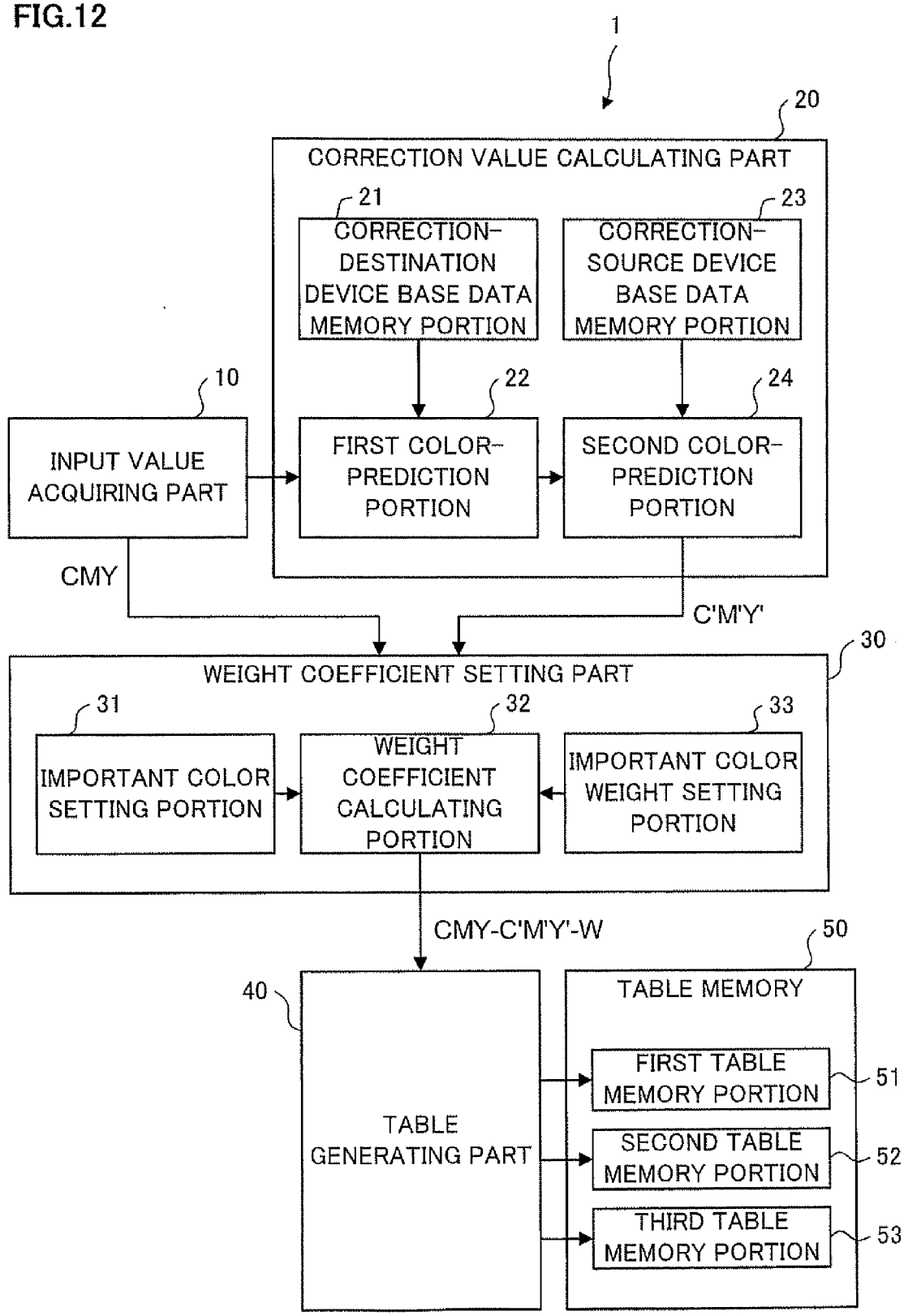
FIG. 12 is a block diagram showing an example of a functional configuration of a color correction coefficient generator in the second and third exemplary embodiments.

FIG. 12 is a block diagram showing an example of a functional configuration of a color correction coefficient generator 1 in the second exemplary embodiment. Among all parts shown in FIG. 12, an input value acquiring part 10, a correction value calculating part 20, a table generating part 40, and a table memory 50 are the same as those in the configuration example in FIG. 1. In contrast, a weight coefficient setting part 30 is different from the configuration example in FIG. 1, in that the weight coefficient setting part 30 includes an important color weight setting portion 33 in addition to an important color setting portion 31 and a weight coefficient calculating portion 32.

Thus, a description is provided here only for a configuration in the weight coefficient setting part 30.

The important color setting portion 31 receives designation of color regions where a user desires to obtain enhanced color reproducibility (for example, color regions considered important by the user), and sets the color regions as important color regions. Here, multiple important color regions are set. In the second exemplary embodiment, the important color setting portion 31 is provided as an example of a receiving unit that receives designation of important color regions.

The important color weight setting portion 33 sets an important color weight that is a weight to be assigned to each of the multiple important color regions set by the important color setting portion 31. In the second exemplary embodiment, the important color weight is used as an example of importance information indicating how much importance is to be placed on each of multiple important color regions, and the important color weight setting portion 33 is provided as an example of an importance information acquiring unit that acquires the importance information.

The weight coefficient calculating portion 32 receives the correction-intended color data acquired by the input value acquiring part 10 and the correction values calculated for the color data by the correction value calculating part 20, and generates a weight coefficient for each set of correction values in accordance with a relationship between the correction-intended color data and the important color region set by the important color setting portion 31, and also in accordance with the important color weight set by the important color weight setting portion 33.

In the second exemplary embodiment, the important color weight setting portion 33 determines the important color weight Pi for an i-th color region among n color regions to be treated as important color regions, according to the number of data pieces in the i-th color region, and calculates the weight coefficient W as $W=\pi(Pi*fi(Di))$, where $\pi(Xi)$ denotes $X1*X2* \ldots *Xn$, fi denotes a weight coefficient calculation function for the i-th region, and Di denotes a variable for the weight coefficient calculation function for the i-th region.

Here, consider a case where a user makes an instruction to place importance on a primary color region and a gray region in a ratio of 1:2. If there are a large number of data pieces in the primary color region while being a small number of data pieces in the gray region, it is preferable to assign a smaller weight to the data in the primary color region, while preferably assigning a larger weight to the data in the gray region. For example, here, suppose that the important color weight for the primary color region is set to 1, whereas the important color weight for the gray region is set to 4. In this case, a weight coefficient is calculated by setting P1=1, using as f1 the primary color oriented function, and using as D1 the distance from the primary color axis, and additionally a weight coefficient is calculated by setting P2=4, using as f2 the gray oriented function, and using as D2 the distance from the gray axis. Then, the final weight coefficient is obtained by multiplying these two weight coefficients.

One of merits of this method is to achieve finer setting of color regions to be treated as important color regions than in the first exemplary embodiment. In addition, the first exemplary embodiment requires matching of the numbers of data pieces in each of target regions when generating the color correction table. For instance, assume that the color correction table is generated with importance on gray under the condition in which there are 10 pieces of data representing colors around gray, and 100 pieces of data representing primary colors. In this case, even if small weights are assigned to the primary color data pieces, such a large number of primary color data pieces have some effect on the calculation, and a desirable table fails to be obtained. In terms of this problem, the second exemplary embodiment does not requires such matching of the numbers of data pieces, since the color correction tables specific to respective important color regions are firstly generated and then are combined together.

(Third Exemplary Embodiment)

In a third exemplary embodiment, the important color weight used in the second exemplary embodiment is set in consideration of a current machine condition.

Although the second exemplary embodiment shows the example in which the importance is placed on the primary color region and the gray region in the ratio of 1:2, this ratio is determined by an empirical value, and is not a value determined in consideration of a current machine condition.

For instance, here consider the case where a result of the comparison among color regions in terms of the deviation of the current machine condition from the standard condition shows that the deviation in the gray region is small while the deviation in a primary color region is large. Even in this case, the second exemplary embodiment uses the fixed ratio in which the importance is placed on the primary color region and the gray region, and accordingly may achieve only insufficient correction for the primary color region in some cases. More specifically, since the correction for the gray region is performed preferentially over the primary color region, the accuracy in the correction for the primary color region that has the large deviation may not be improved sufficiently.

To address this problem, in the third exemplary embodiment, a current color difference between the current machine condition and the standard condition is firstly obtained for each color region by use of initially-acquired raw data representing the current machine condition, and then the color difference is reflected in the weight coefficient.

More specifically, with the configuration shown in FIG. 12, the important color weight setting portion 33 previously figures out a color difference in a particular color between the standard condition and the current machine condition for each of color regions (such as a primary color region and a gray region), and sets the important color weight by using the color difference.

For example, when ei denotes an average color difference in an i-th color region among color regions to be treated as the important color regions, the important color weight Si is given as $Si=ei/(e1+e2+\ldots+en)$. Then, the weight coefficient w added to each piece of color data is calculated according to $w=\pi(Si*fi(D))$, where $\pi(Xi)$ denotes $x1*x2*\ldots*Xn$, fi denotes a weight coefficient calculation function for the i-th region, and Di denotes a variable for the weight coefficient calculation function for the i-th region.

In the third exemplary embodiment, based on the weight coefficients thus calculated, the correction coefficients are calculated subsequently as in the case of the first exemplary embodiment. In this way, a correction result more based on the current machine condition is obtained.

Here, a method of calculating the average color difference and the important color weight for each color region is described by using specific numerical values. FIGS. 13A to 13C show that the average color differences and the important color weights are calculated for color regions, a Y primary color region, a M primary color region and a C primary color region. Here, the Y primary color region, the M primary color region, and the C primary color region are called a first region, a second region, and a third region, respectively. In this case, the average color difference of the Y primary color region is denoted by e1 where e1=1.11; the average color difference of the M primary color region is denoted by e2 where e2=2.28; and the average color difference of the C primary color region is denoted by e3 where e3=0.85. In addition, the important color weight of the Y primary color region is denoted by S1 and $S1=1.11/(1.11+2.28+0.85)\approx0.3$; the important color weight of the M primary color region is denoted by S2 and $S2=2.28/(1.11+2.28+0.85)\approx0.5$; and the important color weight of the C primary color region is denoted by S3 and $S3=0.85/(1.11+2.28+0.85)\approx0.2$.

Note that, in the third exemplary embodiment, the important color weight setting portion 33 performs color prediction using a certain model formula generated on the basis of data pairs in the standard condition and data pairs in the current condition, and then obtain the color difference from the color prediction result. Such model formula is used for the following reasons. Specifically, if the data pairs in the standard condition and the data pairs in the current condition are available from the same patch set, the standard condition and the current condition are easily compared with each other. However, the absence of these two types of data pairs in the same patch set inhibits a comparison between the two conditions and obtaining of the color difference therebetween. Moreover, even though measured values generally include noise, prediction using the measured values of multiple patches is expected to produce an effect of reducing the influence of the noise.

In addition, the important color weight Si given above is obtained by use of the average color difference for each of the color regions, but may be obtained by use of a color difference for each piece of color data.

FIG. 14 is a diagram showing that the important color weight Si is thus calculated on the basis of a color difference for each piece of color data. Note that the important color weight is obtainable from color differences by using a graph, for example. For this reason, the values Si shown in FIG. 14 are not necessarily equal to the values obtained according to $Si=ei/(e1+e2+\ldots+en)$.

When the important color weight is set for each piece of color data, it is expected to achieve correction of a particular color having a large color difference with pinpointed accuracy. However, if such color correction is put into practical use, an obtained correction result may be overly fit because actually-measured color values usually include errors to some extent and the resultant color differences also include errors accordingly. To avoid this, when each piece of color data is weighted according to the color difference before correction, such weighting is desirably performed after errors included in actually-measured color values are reduced by measuring the color multiple times. In addition, since the correction values are eventually fed back to the one-dimensional TRC, it is also conceivable that a shape change may be included in the tone, in a worst-case scenario. Therefore, in a desirable configuration, the tone of the TRC is checked and smoothing processing is performed on the tone if necessary.

(Fourth Exemplary Embodiment)

Besides the configuration of the first exemplary embodiment or the second exemplary embodiment, a fourth exemplary embodiment is provided with a unit that allows a user to adjust setting of weight coefficients set by the weight coefficient setting part 30. The addition of this unit allows the user to intuitively set parameters for the weight coefficient setting. Thus, even a user who is unfamiliar with the adjustment is made to be capable of setting the parameters easily. Making the detailed setting of parameters open to the user allows the parameters to be set finely, thereby bringing achievement of more desirable color correction coefficient designing.

Firstly, an initial screen used for such parameter setting is described.

Figure 15A:
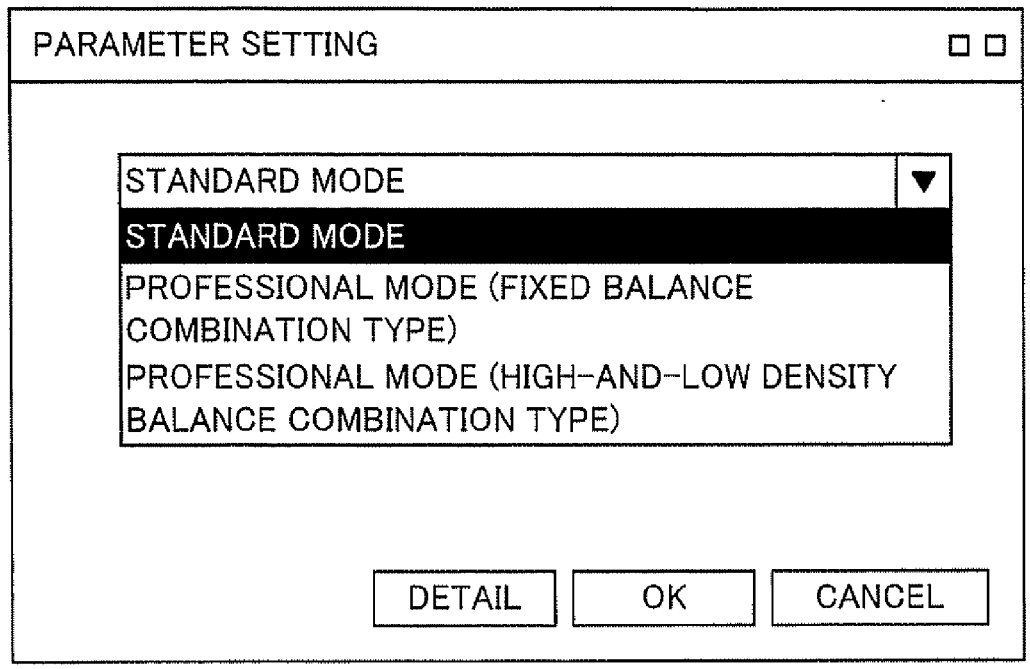
FIGS. 15A and 15B show an example of such an initial screen.
Figure 15B:
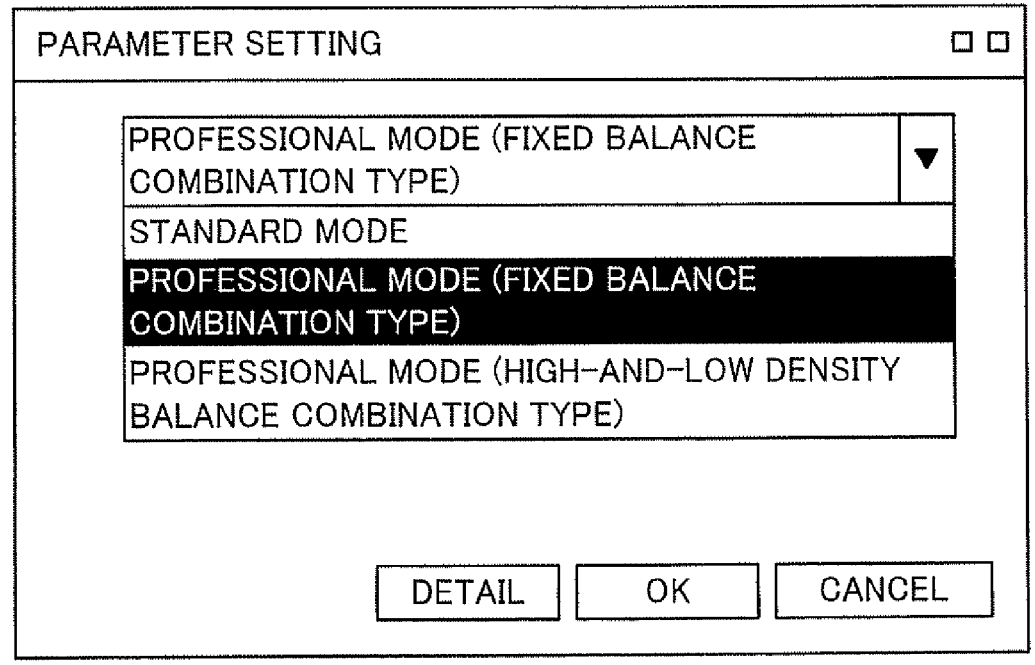

FIGS. 15A and 15B show an example of such an initial screen.

On this screen, a mode for the parameter setting is selected from a standard mode and a professional mode.

The standard mode is a mode for setting recommended fixed parameters, and may be usually used to set the parameters. FIG. 15A shows a state in which the standard mode is going to be selected.

On the other hand, the professional mode is a mode for setting the parameters finely according to a user's purpose. For example, this mode is used in a case of setting different parameters for respective color regions or in other similar cases. The professional mode includes a fixed balance combination type and a high-and-low density balance combination type. FIG. 15B shows that the fixed balance combination type mode is going to be selected.

Hereinafter, the parameter setting for each of the foregoing modes will be described in detail.

In the first place, the parameter setting for the standard mode is explained.

Figure 16A:
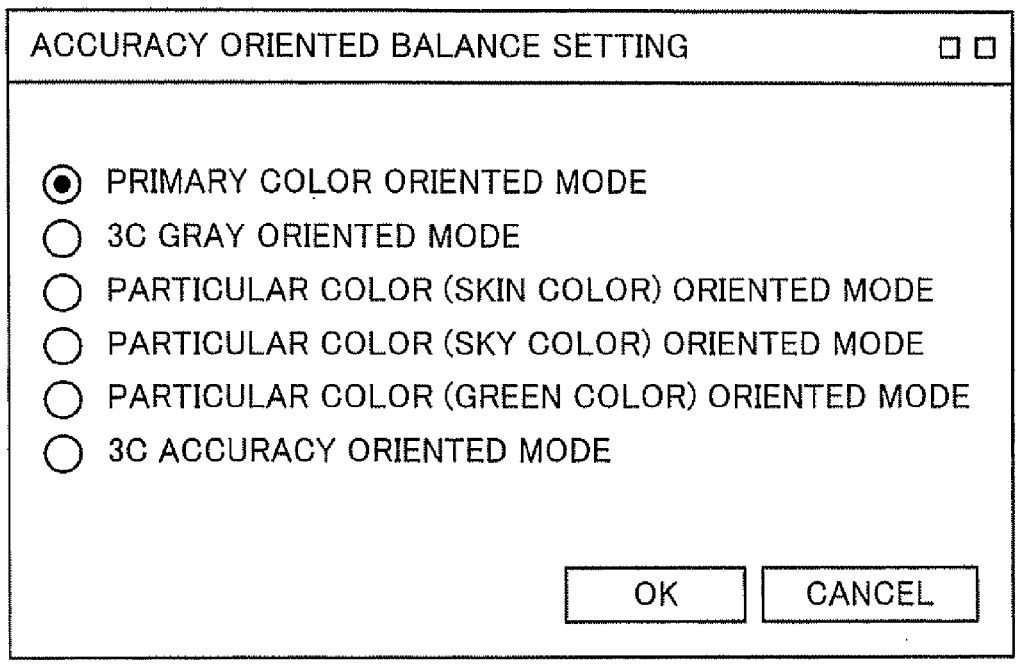
FIGS. 16A and 16B show examples of a screen used in the standard mode.
Figure 16B:
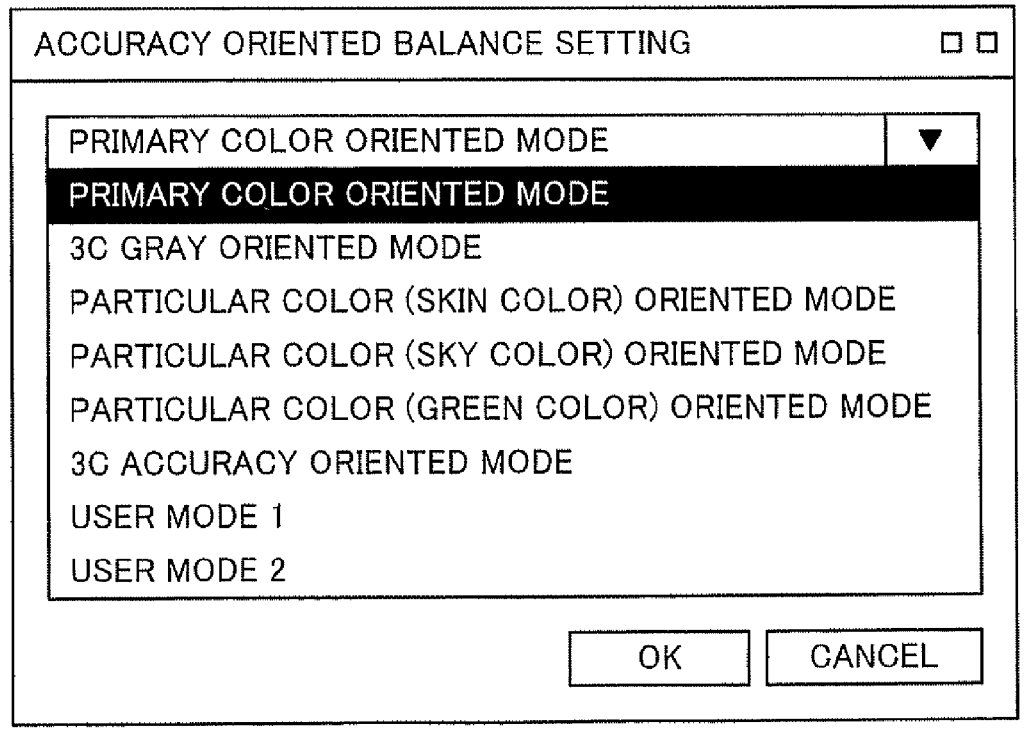

FIGS. 16A and 16B show examples of a screen used in the standard mode (screen of an accuracy oriented balance setting).

As shown in the screens, multiple modes in which fixed parameters are assigned in advance are prepared as the standard mode. This screen is designed to allow a user to select one of these modes to set a color region as an important color region. Such color region selection is presented by use of radio buttons in FIG. 16A, or by use of a list box in FIG. 16B.

In these screens in FIGS. 16A and 16B, a primary color oriented mode is selected. Thus, the important color setting portion 31 sets primary color oriented parameters prepared in advance. Besides this mode, these screens show set-up items such as a 3C gray (an achromatic color of a mixture of three colors) oriented mode and a particular color oriented mode. A 3C accuracy oriented mode is a mode in which importance is placed on all colors evenly. In addition, as shown in FIG. 16B, user modes may be provided as a mode in which a user is allowed to freely set parameters. These modes are intended to be used in the professional mode describing later. Provision of this user mode for which a user-desired parameter set is stored in advance allows a user to set again the user-desired parameter set without having to make a complicated setting operation again.

Figure 17A:
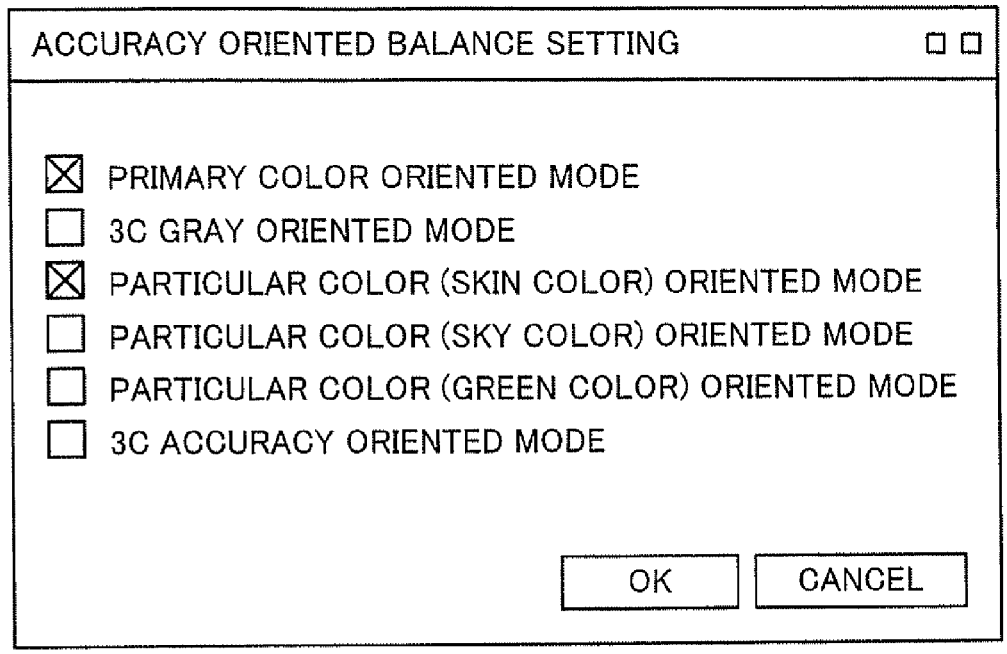
FIGS. 17A and 17B show examples of screens used in the standard mode to allow a user to set multiple color regions.
Figure 17B:
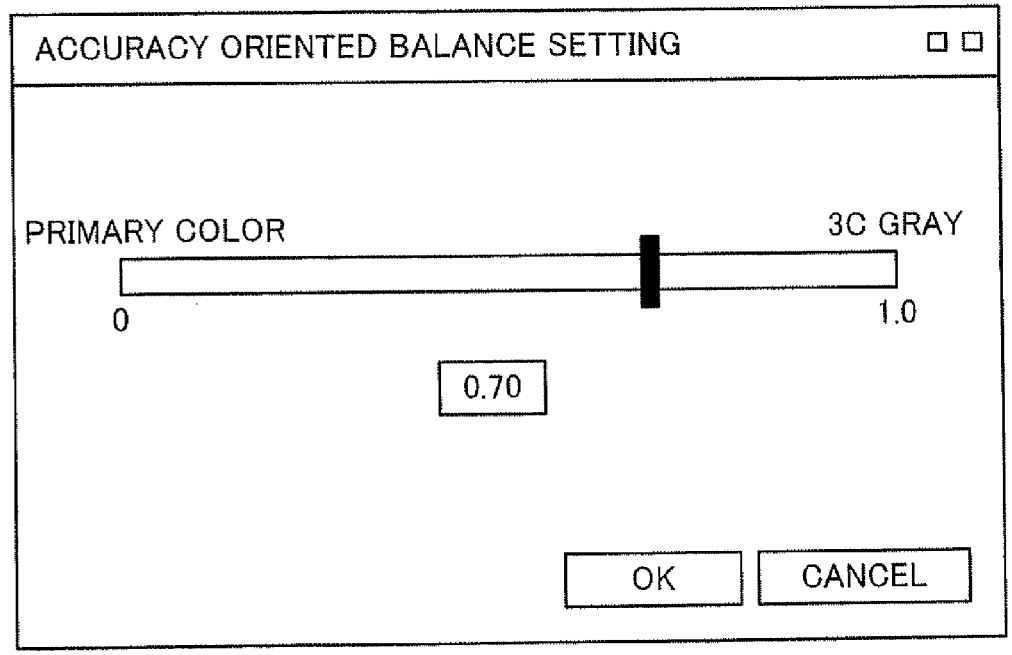

In addition, FIGS. 17A and 17B show examples of screens used in the standard mode to allow a user to set multiple color regions. Advantages of these screens shown in FIG. 17A and 17B are as follows. For example, the screen shown in FIG. 17A allows the user to obtain color correction coefficients with importance on multiple color regions of a skin color and primary colors. In addition, the screen shown in FIG. 17B is a screen with a slider bar to set weights to be assigned on multiple color regions by the important color weight setting portion 33 described in the second exemplary embodiment. Such slider bar setting allows a user to set the parameters matching his/her sense more. FIG. 17B shows an example in which a balance between a primary color and a 3C gray are set with the primary color and 3C gray selected as the multiple color regions. Instead of this, another combination of color regions is also selectable and then a balance between them is settable. Alternatively, three or more color regions are selectable at one time and a balance among them is also selectable. In this case, a weight for each of these color regions may be set on a circle provided with the names of three or more color regions and slider bars. More specifically, the names of the three or more color regions are arranged on the circumference of the circle, and the slider bars are provided between the center of the circle and the respective names of the color regions. When an object is operated to move toward one of the names of the color regions on each of the slider bars, the weight for the color region corresponding to the slider bar is set.

In the second place, the parameter setting in the professional mode (fixed balance combination type) will be described.

Figures 1A, 19:
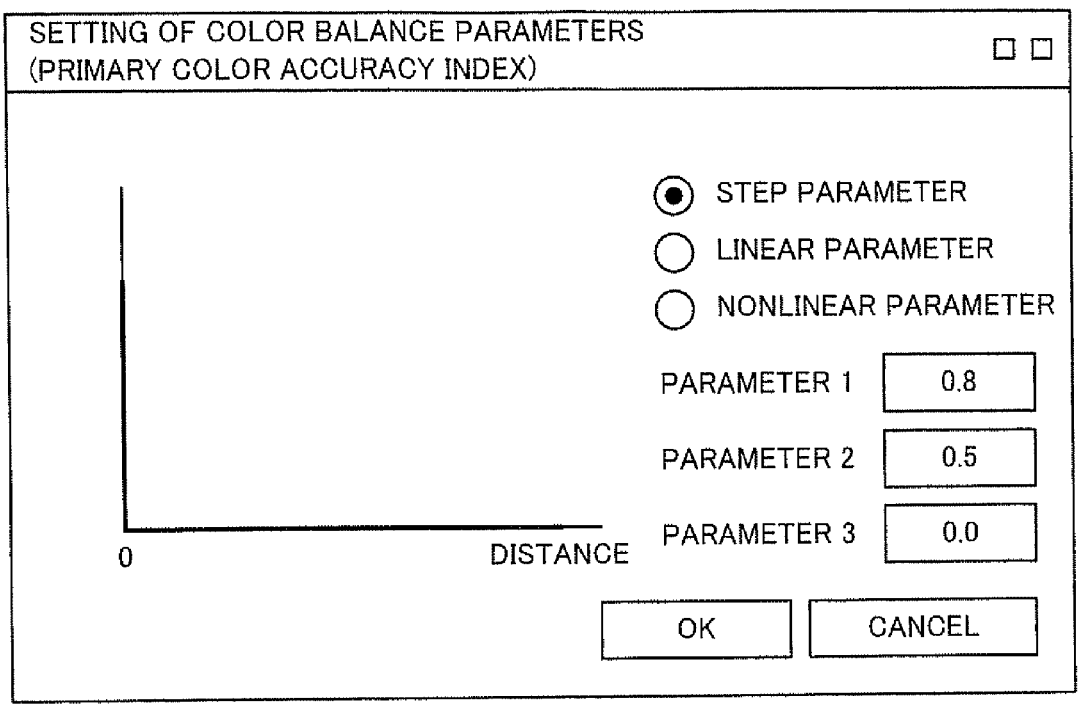
Figures 1B, 19:
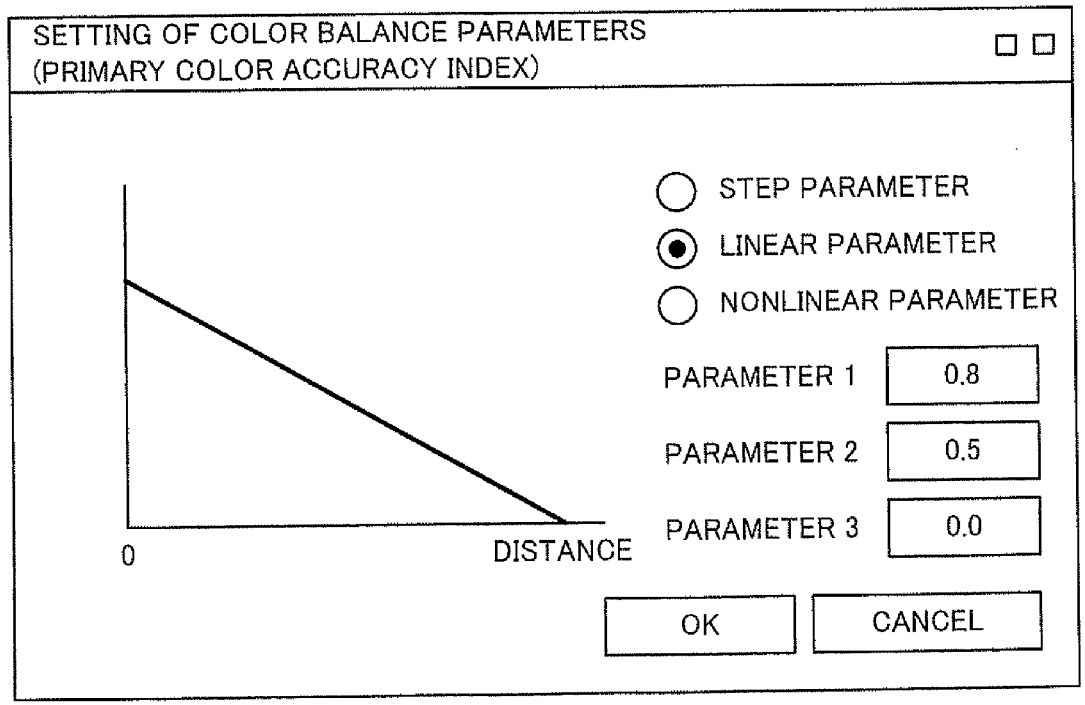
Figures 2C, 19:
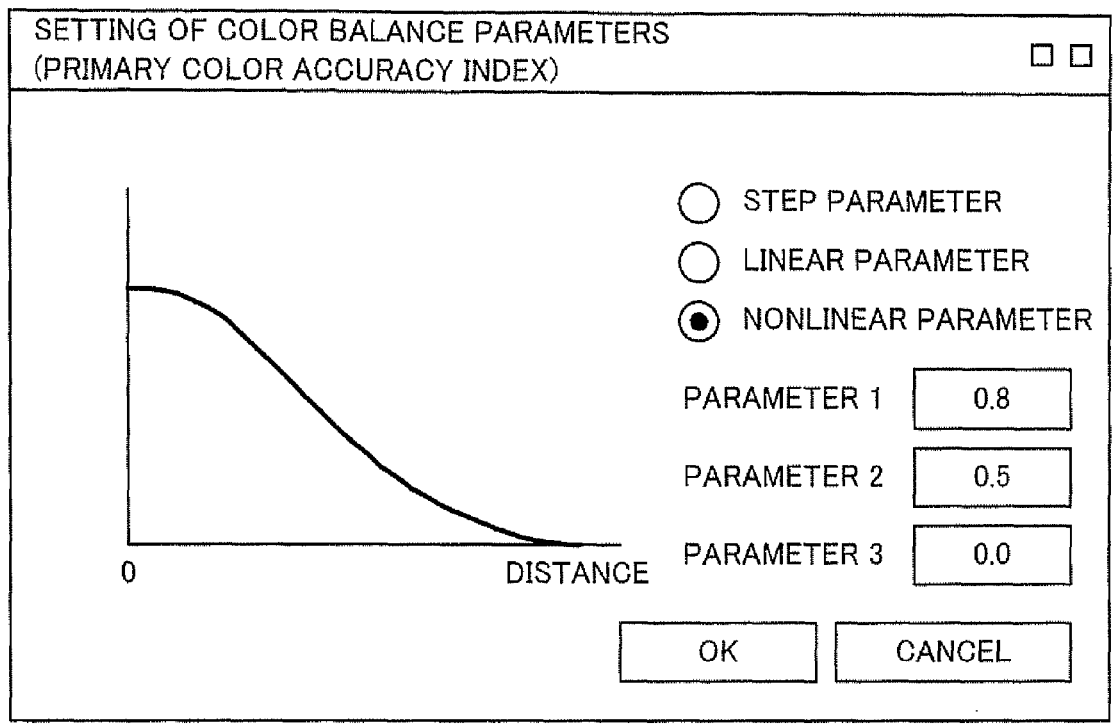

FIGS. 18-1A to 18-2C show examples of a parameter setting screen used in the professional mode (fixed balance combination type).

This screen allows a user to make parameter adjustment. Accuracy balances are settable by setting an accuracy index value for each of color regions. The accuracy indexes corresponding to the modes in FIG. 17A are shown in FIG. 18-1A as setting items, but are not limited to those. For instance, as shown in FIG. 18-1B, a designable configuration is one that allows a user to set a 2C pure color (a pure color of secondary colors) or a 2C color (secondary colors other than a pure color). In addition, FIG. 18-2C shows an alternative designable configuration for setting a parameter for each of colors such as primary colors C, M and Y and secondary colors R, G and B. Moreover, in another designable configuration, shown as particular-color manuals, a user is allowed to designate user-desired particular colors that the user considers as important, and to set parameters for these particular colors. Then, the important color setting portion 31 sets these parameters.

As described above, the professional mode allows detailed parameters to be set, and thus allows the color correction coefficients to be calculated for user-desired important color regions.

Next, a description will be provided for setting of color balance parameters in this professional mode (fixed balance combination type). Note that, the color balance parameter is one example of color weight information indicating how much colors not belonging to an important color region are reflected in the weight coefficient for the important color region.

Figures 2D, 19:
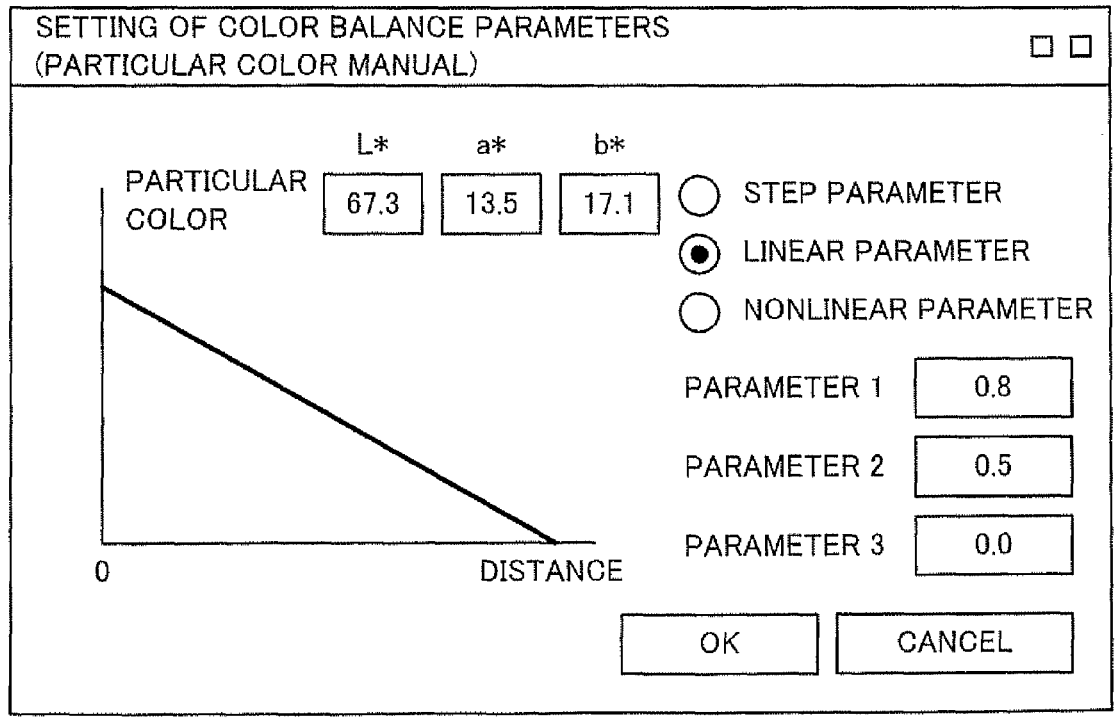
Figures 3E, 19:
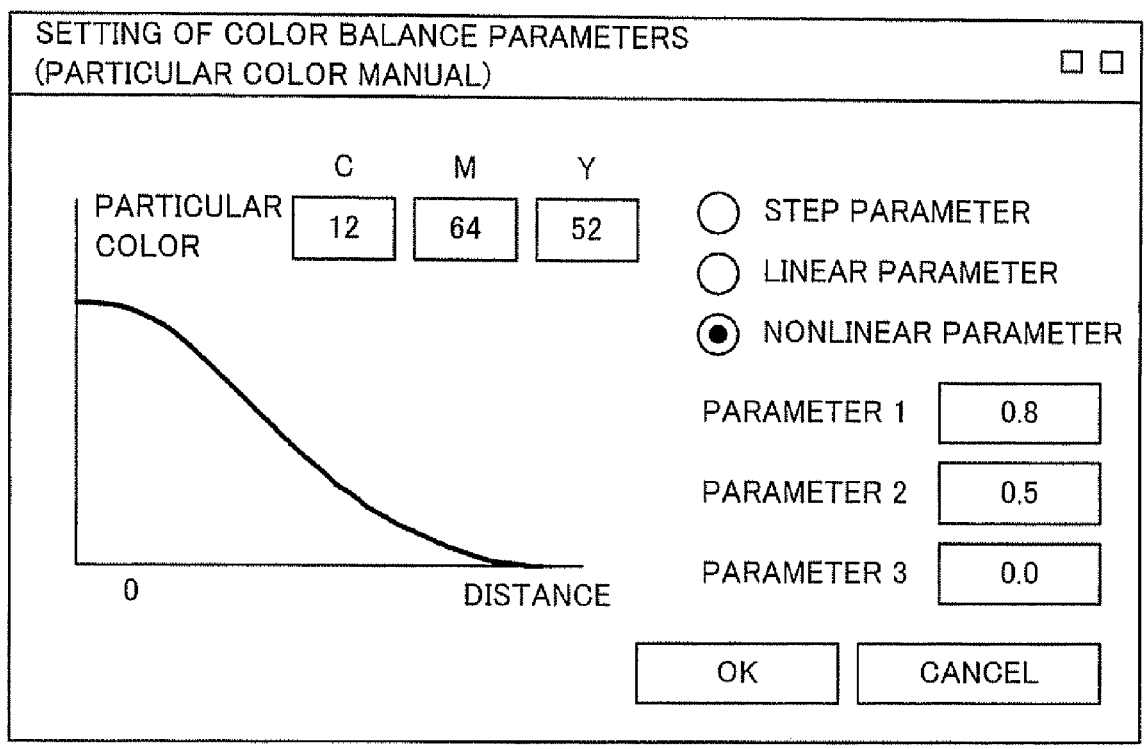

FIGS. 19-1A to 19-3E show examples of screens used to set color balance parameters. This color balance parameter is set for each of parameters, such as the primary color accuracy index and the 3C gray accuracy index, set for each of the color regions. To be more precise, for example, a setting screen for the color balance parameter of the primary color is displayed when a "SETTING" button on the right end in the line of the primary color accuracy index in FIG. 18-1A is pressed, and a setting screen for the color balance parameter of the 3C gray is displayed when a "SETTING" button on the right end in the line of the 3C gray accuracy index in FIG. 18-1A is pressed.

For instance, in FIG. 19-1A, a step parameter (stepped parameter) among color balance parameters is set. When explanation is given by taking the primary color accuracy index as an example, this step parameter is a parameter that sets "1" only for the weight coefficient for data on colors existing exactly on the primary color axis, while setting "0" for the weight coefficients for data on colors existing even slightly out of the primary color axis. In other words, this is the parameter setting in which the parameters are designed on the primary color oriented basis, and in which the correction values are calculated only by using the data on the primary colors because the data on colors other than the primary colors are not weighted at all.

In FIG. 19-1B, a linear parameter (line-shaped parameter) among the color balance parameters is set. When explanation is given also by taking the primary color accuracy index as an example like the foregoing explanation, this linear parameter is a parameter that sets "1" only for the weight coefficient of data on colors existing exactly on the primary color axis, while setting "0" for the weight coefficient of data on a color existing farthest from the primary color axis. In addition, between 1 and 0, the weight coefficient of data on a color is set to a value which is linearly reduced as the distance between the color and the primary color axis is getting longer. In other words, this is the parameter setting in which the parameters are designed on the primary color oriented basis, and in which a larger weight is assigned to data on a color existing closer to the primary color axis while a smaller weight is assigned to data on a color existing farther from the primary color axis. As dissimilar to the example shown in FIG. 19-1A, even though the correction is performed with importance on the data on the colors on the primary color axis, the correction values are calculated by additionally using data on colors other than the primary colors. Thus, unlike the correction made only by using the primary color data, the correction values thus obtained are also based on data on color other than the primary colors to some extent.

Instead, in FIG. 19-2C, a nonlinear parameter (not-line-shaped parameter) among the color balance parameters is set. When explanation is given also by taking the primary color accuracy index as an example like the foregoing explanation, this nonlinear parameter is a parameter that sets "1" only for the weight coefficient of data on colors existing exactly on the primary color axis, while setting "0" for the weight coefficient of data on a color existing farthest from the primary color axis. Between "1" and "0," the weight coefficient of data on a color is set to a value which is nonlinearly reduced as the distance between the color and the primary color axis is getting longer. While the parameters are controlled linearly in the example in FIG. 19-1B, the parameters are controlled nonlinearly in the example in FIG. 19-2C, thereby achieving more detailed parameter control. Note that this non-linear parameter is here controlled by use of three parameters that are parameters 1 to 3, but may be controlled by other parameters as long as the parameters have a monotonous shape.

Besides these, FIGS. 19-2D and 19-3E show setting screens for setting the weight coefficients for particular colors when the particular colors are manually designated (manually inputted).

FIG. 19-2D shows that a linear parameter is set for a particular color set by use of L*a*b* values. In this linear parameter, the weight coefficient for the L*a*b* values is set to "1," and the weight coefficient of data on a color is set to a value which is linearly reduced as the distance between the color and the L*a*b* values is getting longer.

Alternatively, FIG. 19-3E shows a configuration basically the same as that in FIG. 19-2D, but different from that in FIG. 19-2D in that a particular color is given as CMY values. Although these three CMY colors are used here, multiple colors such as four colors including K, or five or more colors are also usable. The provision of this particular color manual setting allows a user to make finer setting of a color region considered as important by the user.

The color balance parameters set on the setting screens in FIGS. 19-1A to 19-3E are set by a function setting part (not shown) that sets the "predetermined function" used in step 303 in FIG. 4.

As described above, each of FIGS. 19-1A to 19-3E shows that the relationship between the weight coefficient and the distance from the important color is graphed according to the parameter setting. These graphs thus formed allow a user to intuitively set the parameters, thereby supporting the parameter setting operation.

In the third place, parameter setting in the professional mode (high-and-low density balance combination type) is explained.

FIG. 20 shows an example of a parameter setting screen used in the professional mode (high-and-low density balance combination type).

This screen is used in a case of changing a balance value according to the density. In FIG. 20, the primary color oriented parameters are set for light colors (colors at low density) and the 3C gray oriented parameters are set for dark colors (colors at high density). Then, the important color setting portion 31 sets these parameters.

Use of this setting allows a user to make finer setting of color regions to be treated as the important color regions. Applicable general usage of this setting is a correction method designed in consideration of such a visual characteristic that the sensitivity for a deviation amount in the gray balance becomes higher than that for a deviation amount in the primary colors as the color brightness becomes lower. More specifically, in this method, the correction is made with importance on the reproducibility of primary colors for part with high color brightness and the reproducibility of 3C gray colors for part with low color brightness.

In addition, this professional mode (high-and-low density balance combination type) also allows color balance parameter to be set for each color region in order to adjust a balance in a region at an intermediate density between the high and low densities. Note that the color balance parameter here is one example of importance information for each of multiple density levels of an important color region.

Figure 21:
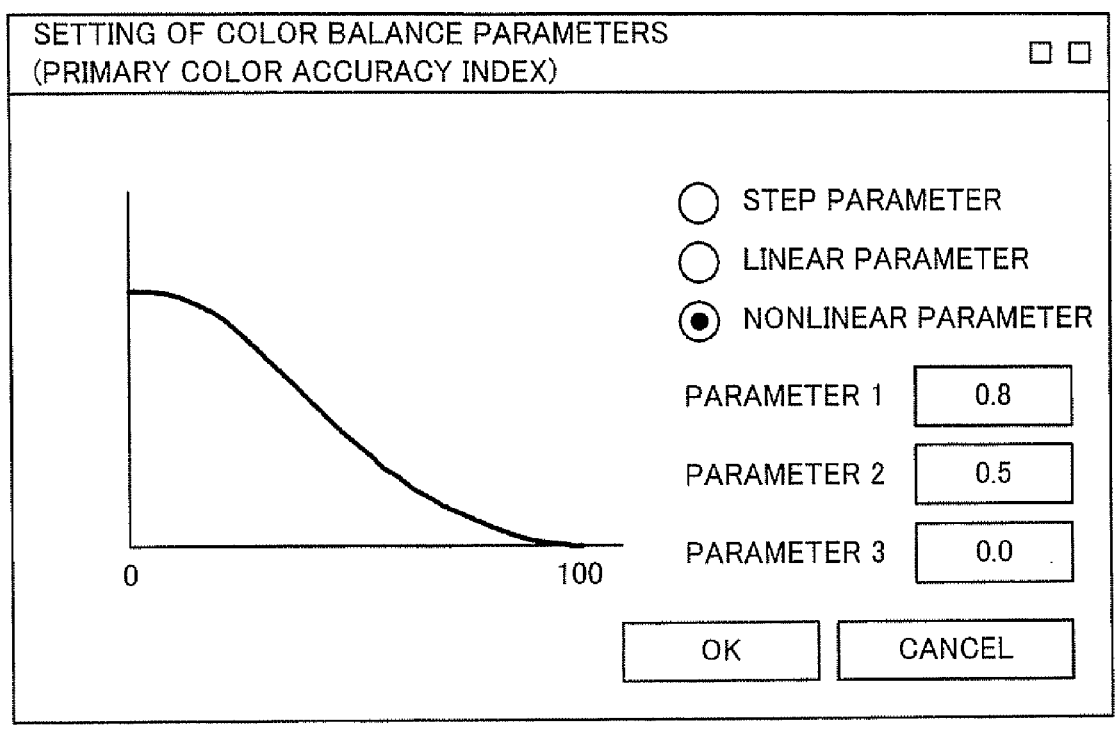
FIG. 21 shows an example of a screen used for setting this color balance parameter.

FIG. 21 shows an example of a screen used for setting this color balance parameter. Here, the horizontal axis indicates the density level instead of the distance from each color region that is shown in FIGS. 19-1A to 19-3E. In addition, this color balance parameter is set for each of the parameters, such as the primary color accuracy index and the 3C gray accuracy index, designated for each color region. To be more precise, for example, a setting screen for the color balance parameter for the primary color is displayed when a "SETTING" button on the right end in the line of the primary color accuracy index in FIG. 20 is pressed.

Moreover, this professional mode (high-and-low density balance combination type) is configured to display a screen for confirming an accuracy balance configuration.

Figure 22:
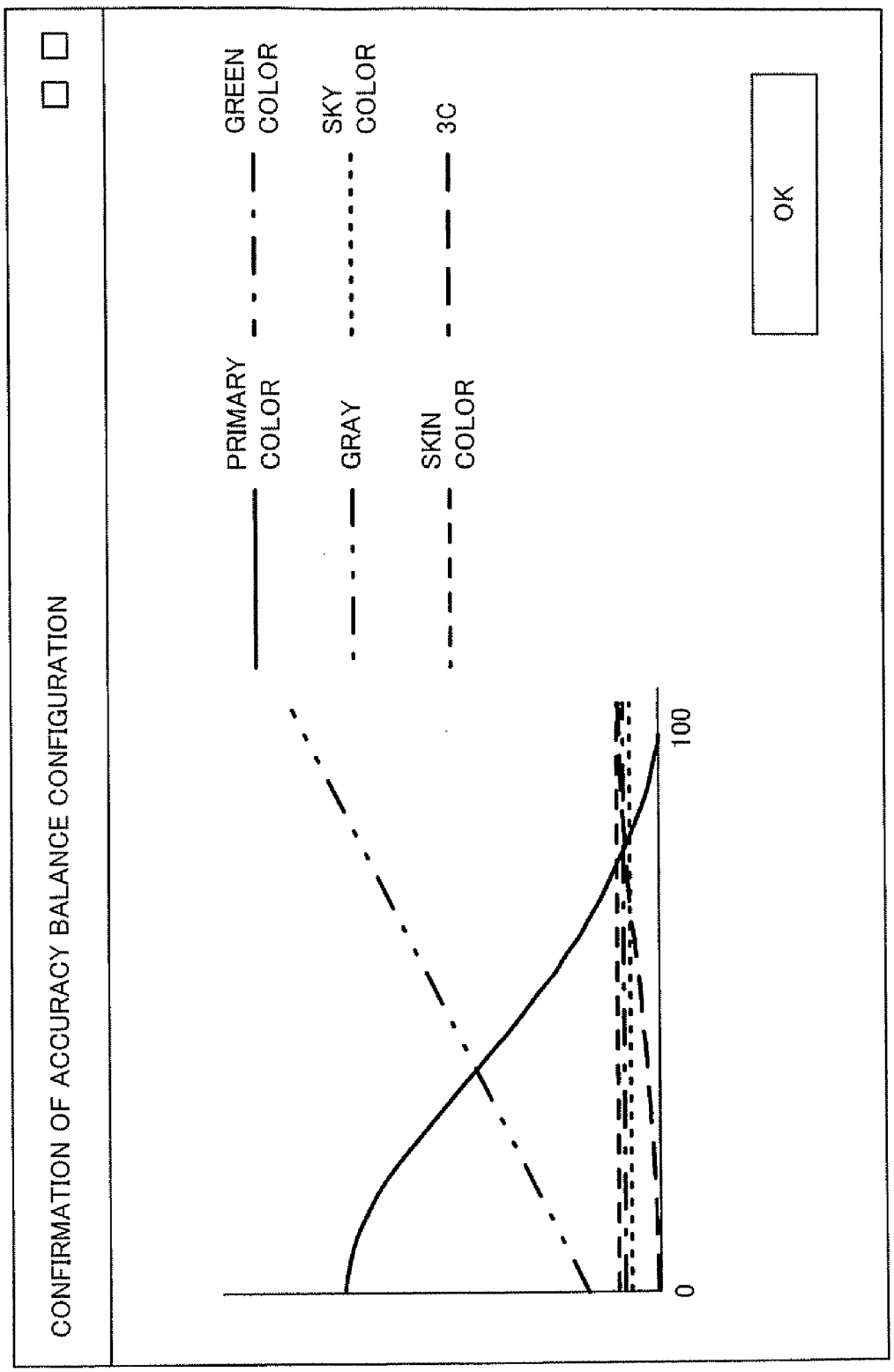
FIG. 22 shows an example of a screen for confirming the accuracy balance configuration.

FIG. 22 shows an example of a screen for confirming the accuracy balance configuration. Note that the maximum value (the rightmost value in the graph) of the density differs depending on the color regions. However, each maximum value of the density is set to "100" in this graph for convenience. In addition, each minimum value of the density (the leftmost value) is set to "0." With this screen shown in FIG. 22, it is confirmed that the weight for the primary color is set to reduce non-linearly as the density increases, and the weight for the gray is set to increase linearly as the density increases. In addition, it is also confirmed that the weights for the skin color, the green color and the sky color are set to be constant regardless an increase in the density, and that the weight for the 3C is set to increase non-linearly as the density increases.

Providing such a screen allows a user to intuitively confirm the parameters set by the user.

As described above, the fourth exemplary embodiment is provided with the setting screens for design support used when a user designs the weight coefficient. By use of these screens, the user surely makes setting for the weight coefficients as desired.

However, in the fourth exemplary embodiment, the user interface for the setting support is not necessarily the screens. Accordingly, it is said that a display mechanism 95 (see FIG. 23) that displays the setting screens in the fourth exemplary embodiment is only one example of an output unit that outputs the user interface.

The processing of generating the color correction coefficients according to the present exemplary embodiments may be achieved by a generally used computer. Provided that the processing is achieved by the computer 90, a hardware configuration thereof is described.

Figure 23:
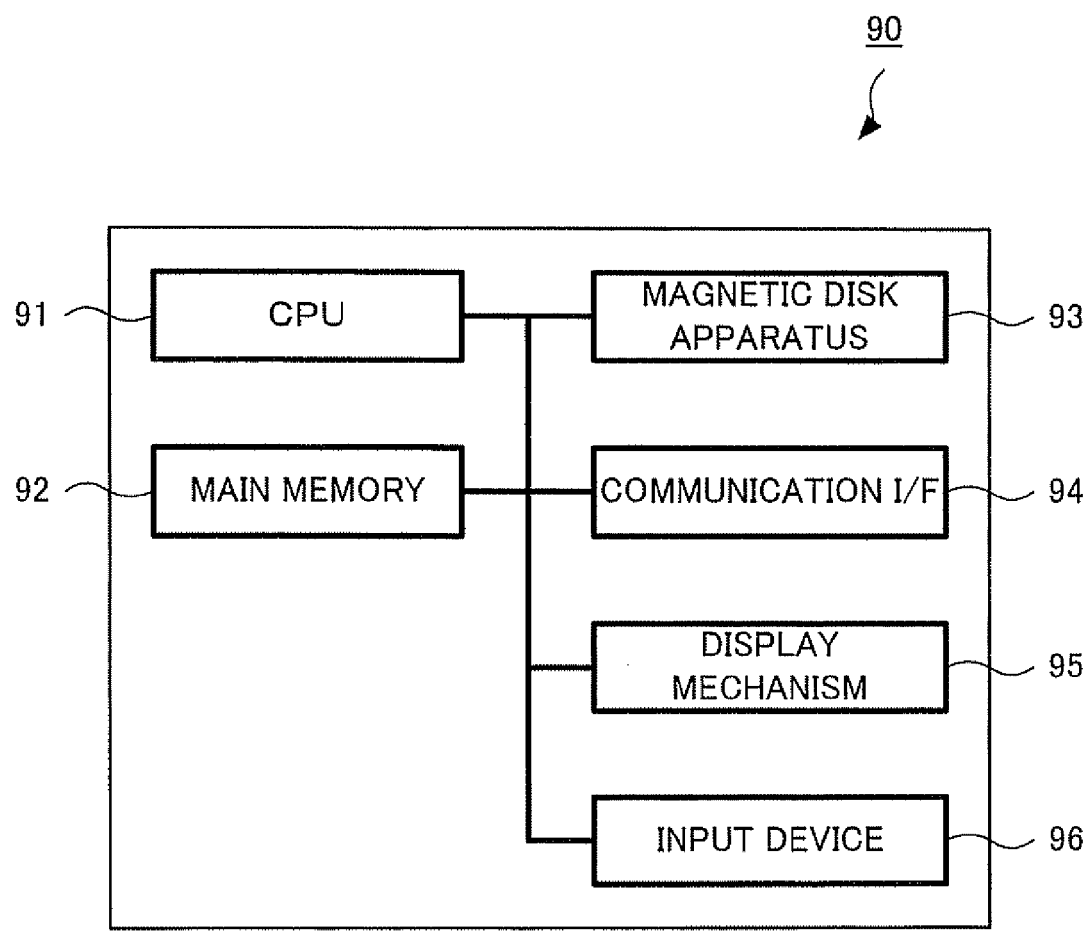
FIG. 23 is a diagram illustrating the hardware configuration of the computer.

FIG. 23 is a diagram illustrating the hardware configuration of the computer 90.

As shown in FIG. 23, the computer 90 includes a central processing unit (CPU) 91, a main memory 92 and a magnetic disk apparatus (HDD: Hard Disk Drive) 93 that are a memory. Here, the CPU 91 executes operation system (OS) and various kinds of software such as application, and realizes various functions as mentioned above. The main memory 92 is a memory area that stores various kinds of software, data used for executing the software and the like. The magnetic disk apparatus 93 is a memory area that stores input data to various kinds of software, output data from various kinds of software and the like.

Further, the computer 90 includes a communication I/F 94 that performs communication with external devices, a display mechanism 95 including a video memory, a display and the like, and an input device 96 such as a keyboard, the mouse or the like.

The program that achieves the present exemplary embodiments may be provided not only by a communication unit but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color correction coefficient generator comprising:
a first color value acquiring unit that acquires correction-intended color values in a color space configured of a plurality of color components including a particular color component;
a second color value acquiring unit that acquires correction color values being color values in the color space configured of a plurality of color components including the particular color component, and the correction color values being color values used to correct the correction-intended color values;
a weight coefficient acquiring unit that acquires weight coefficients for the correction-intended color values; and
a generating unit that generates a color correction coefficient on the basis of the correction color values for correcting the correction-intended color values having the particular color component at a density of a particular density value and on the basis of the weight coefficients for the correction-intended color values, the color correction coefficient used to correct the particular density value,
wherein the generating unit generates a one-dimensional color correction table indicating associations between a plurality of density values of the particular color component and a plurality of color correction coefficients for correcting the respective density values, and the generating unit generates the color correction coefficient for correcting the particular density value of the particular color component, by performing local regression with weights assigned to weight coefficients for the correction-intended color values each having the particular color component at a density of a different density value, each of the weights determined according to a difference between the particular density value and the different density value.

2. The color correction coefficient generator according to claim 1, further comprising a receiving unit that receives designation of an important color region as a color region to be given importance in color correction, wherein
the first color value acquiring unit acquires the correction-intended color values according to the designation of the important color region received by the receiving unit.

3. The color correction coefficient generator according to claim 1, wherein the generating unit generates the color correction coefficient by calculating, with using the weight coefficients as a weight, a weighted average of the correction color values.

4. The color correction coefficient generator according to claim 1, further comprising a receiving unit that receives designation of an important color region as a color region to be given importance in color correction, wherein
the weight coefficient acquiring unit acquires the weight coefficients according to the designation of the important color region received by the receiving unit.

5. The color correction coefficient generator according to claim 4, wherein
the receiving unit receives designation of a plurality of the important color regions, and the weight coefficient acquiring unit acquires the weight coefficients on the basis of the designation of the plurality of important color regions received by the receiving unit, and on the basis of importance information indicating how much each of the plurality of important color regions is to be given importance.

6. The color correction coefficient generator according to claim 5, further comprising an importance information acquiring unit that acquires the importance information on the basis of a distribution state of the correction-intended color values.

7. The color correction coefficient generator according to claim 5, further comprising an importance information acquiring unit that acquires the importance information on the basis of a comparison result between color reproducibility of a standard machine condition and color reproducibility of a current machine condition.

8. The color correction coefficient generator according to claim 1, further comprising an output unit that outputs a user interface for inputting designation of an important color region as a color region to be given importance in color correction, wherein
the weight coefficient acquiring unit acquires the weight coefficients on the basis of the designation of the important color region inputted through the user interface outputted from the output unit.

9. The color correction coefficient generator according to claim 8, wherein
the output unit outputs the user interface for inputting designation of a plurality of the important color regions, and importance information indicating how much each of the plurality of important color regions is to be given importance, and
the weight coefficient acquiring unit acquires the weight coefficients on the basis of the designation of the plurality of important color regions and the importance information inputted through the user interface outputted from the output unit.

10. The color correction coefficient generator according to claim 9, wherein the user interface is configured to allow the importance information to be inputted for each of density levels of the plurality of important color regions.

11. The color correction coefficient generator according to claim 9, wherein the user interface is configured to allow the importance information to be inputted by performing any one of an operation to move an object on a slider bar and an operation to set a numeric value.

12. The color correction coefficient generator according to claim 8, wherein
the output unit outputs the user interface for further inputting color weight information indicating how much a color out of the important color region is to be reflected in the weight coefficients, and
the weight coefficient acquiring unit acquires the weight coefficients further on the basis of the color weight information inputted through the user interface outputted by the output unit.

13. A color correction coefficient generation method comprising:
utilizing a processor and a memory containing instructions to be carried out by the processor to perform:
acquiring correction-intended color values in a color space configured of a plurality of color components including a particular color component;
acquiring correction color values being color values in the color space configured of a plurality of color components including the particular color component, and the correction color values being color values used to correct the correction-intended color values;
acquiring weight coefficients for the correction-intended color values;
generating a color correction coefficient on the basis of the correction color values for correcting the correction-intended color values having the particular color component at a density of a particular density value and on the basis of the weight coefficients for the correction-intended color values, the color correction value used to correct the particular density value; and
generating a one-dimensional color correction table indicating associations between a plurality of density values of the particular color component and a plurality of color correction coefficients for correcting the respective density values, and generating the color correction coefficient for correcting the particular density value of the particular color component, by performing local regression with weights assigned to weight coefficients for the correction-intended color values each having the particular color component at a density of a different density value, each of the weights determined according to a difference between the particular density value and the different density value.

14. A computer readable medium storing a program causing a computer to execute a process for color correction coefficient generation, the process comprising:
acquiring correction-intended color values in a color space configured of a plurality of color components including a particular color component;
acquiring correction color values being color values in the color space configured of a plurality of color components including the particular color component, and the correction color values being color values used to correct the correction-intended color values;
acquiring weight coefficients for the correction-intended color values; and
generating a color correction coefficient on the basis of the correction color values for correcting the correction-intended color values having the particular color component at a density of a particular density value and on the basis of the weight coefficients for the correction-intended color values, the color correction value used to correct the particular density value,
further comprising generating a one-dimensional color correction table indicating associations between a plurality of density values of the particular color component and a plurality of color correction coefficients for correcting the respective density values, and generating the color correction coefficient for correcting the particular density value of the particular color component, by performing local regression with weights assigned to weight coefficients for the correction-intended color values each having the particular color component at a density of a different density value, each of the weights determined according to a difference between the particular density value and the different density value.

* * * * *